US008909902B2

(12) United States Patent
Latorre et al.

(10) Patent No.: US 8,909,902 B2
(45) Date of Patent: Dec. 9, 2014

(54) SYSTEMS, METHODS, AND APPARATUSES TO DECOMPOSE A SEQUENTIAL PROGRAM INTO MULTIPLE THREADS, EXECUTE SAID THREADS, AND RECONSTRUCT THE SEQUENTIAL EXECUTION

(75) Inventors: Fernando Latorre, Barcelona (ES); Josep M. Codina, Barcelona (ES); Enric Gibert Codina, Sant Cugat del Valles (ES); Pedro Lopez, Molins de Rei (ES); Carlos Madriles, Barcelona (ES); Alejandro Martinez Vincente, Barcelona (ES); Raul Martinez, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 1082 days.

(21) Appl. No.: 12/624,804

(22) Filed: Nov. 24, 2009

(65) Prior Publication Data
US 2010/0269102 A1 Oct. 21, 2010

Related U.S. Application Data

(60) Provisional application No. 61/200,103, filed on Nov. 24, 2008.

(51) Int. Cl.
G06F 9/40 (2006.01)
(52) U.S. Cl.
USPC ...................................................... 712/205
(58) Field of Classification Search
None
See application file for complete search history.

(56) References Cited

U.S. PATENT DOCUMENTS

| 7,376,800 | B1 * | 5/2008 | Choquette et al. ............ 711/147 |
| 2007/0192545 | A1 * | 8/2007 | Gara et al. ..................... 711/141 |
| 2007/0220525 | A1 | 9/2007 | State et al. |
| 2007/0234315 | A1 | 10/2007 | Branda et al. |
| 2009/0019272 | A1 * | 1/2009 | Cypher et al. ................ 712/234 |

OTHER PUBLICATIONS

Foreign counterpart Application No. PCT/US2009/065735, Notification of Transmittal of the International Search Report and the Written Opinion of the International Searching Authority, or the Declaration, mailed Jul. 8, 2010, 10 pages.
Nakano, H., "Static Coarse Grain Task Scheduling with Cache Optimization Using OpenMP. International Journal of Parallel Programming" Jun. 2003, vol. 31, No. 3, pp. 211-223.
Marcuello, P. "Thread Partitioning and Value Prediction for Exploiting Speculative Thread-Level Parallelism" IEEE Transactions on Computers, Feb. 2004, vol. 53, No. 2, pp. 114-125.
Madriles, C., et al., "Anaphase: A Fine-Grain Thread Decomposition Scheme for Speculative Multithreading" 2009 18th International Conference on Parallel Architectures and Compilation Techniques, IEEE Computer Society, pp. 15-25.
Madriles, C., et al., "Boosting Single-thread Performance in Multicore Systems through Fine-Grain Multi-Threading" ISCA, Jun. 20-24, 2009, ACM, 10 pages.

* cited by examiner

*Primary Examiner* — Robert Fennema
*Assistant Examiner* — John Lindlof
(74) *Attorney, Agent, or Firm* — Blakely, Sokoloff, Taylor & Zafman LLP

(57) ABSTRACT

Systems, methods, and apparatuses for decomposing a sequential program into multiple threads, executing these threads, and reconstructing the sequential execution of the threads are described. A plurality of data cache units (DCUs) store locally retired instructions of speculatively executed threads. A merging level cache (MLC) merges data from the lines of the DCUs. An inter-core memory coherency module (ICMC) globally retire instructions of the speculatively executed threads in the MLC.

13 Claims, 30 Drawing Sheets

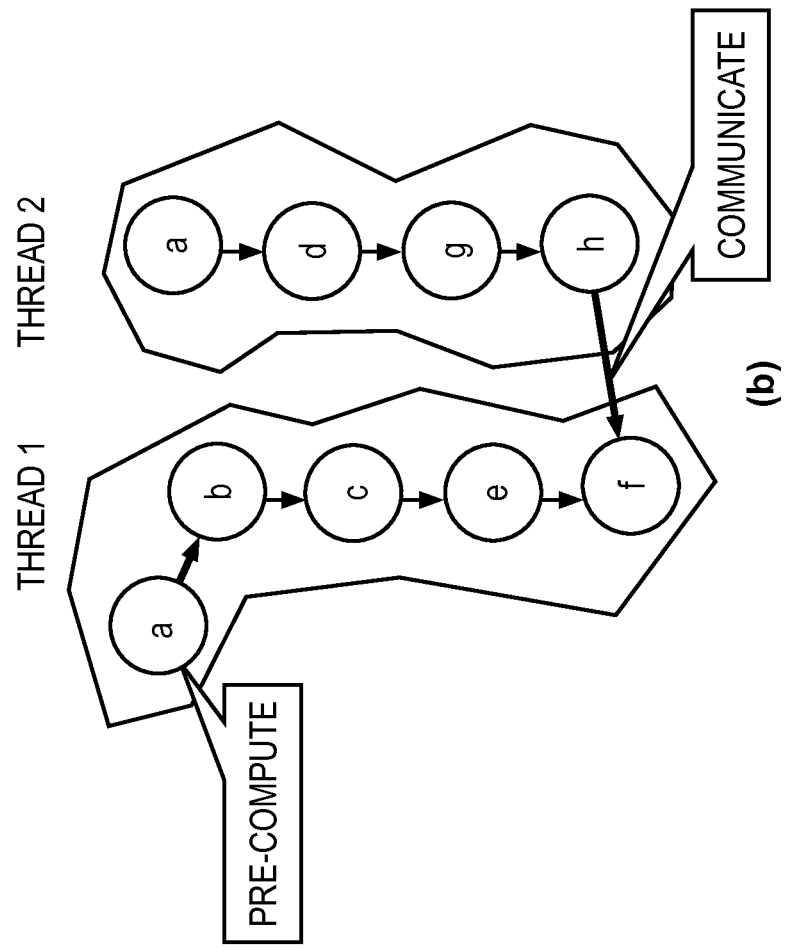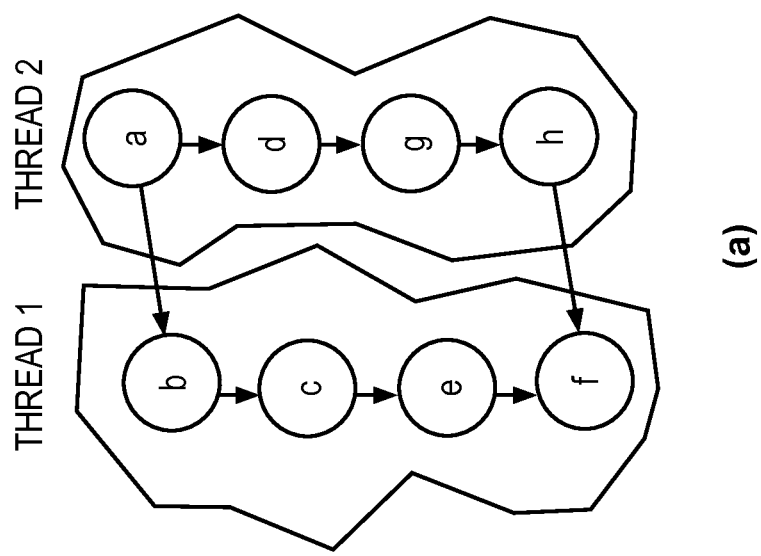
Figure 4

| Original Code | T0 | T1 | T2 |
|---|---|---|---|
| SI = SI +D1<br>CX = CX *2<br>AX = AX +1<br>CX = CX + AX<br>BX[AllFlags] =AX + 1<br>Bz LABEL<br>CX = AX + BX<br>AX = 0<br>LABEL:<br>DX – SI*2<br>AX = AX*2 | SI = SI + D1<br>DX = SI * 2 | CX = XC * 2<br>CX = CX + AX<br>Bz LABEL_T1<br>CX = AX + BX<br>LABEL_T1: | AX = AX + 1<br>BX[AllFlags] =AX + 1<br>Bz LABEL_T2<br>AX = 0<br>LABEL_T2:<br>AX = AX *2 |

(a) single control flow computation

| Original Code | T0 | T1 | T2 |
|---|---|---|---|
| SI = SI +D1<br>CX = CX *2<br>AX = AX +1<br>CX = CX + AX<br>BX[AllFlags] =AX + 1<br>Bz LABEL<br>CX = AX + BX<br>AX = 0<br>LABEL:<br>DX – SI*2<br>AX = AX*2 | SI = SI + D1<br>DX = SI * 2 | AX = AX + 1<br>CX = CX * 2<br>CX = CX + AX<br>BX[ALLFlags] =AX+1<br>Bz LABEL_T1<br>CX = AX + BX<br>LABEL_T1: | AX = AX + 1<br>BX[ALLFlags] =AX+1<br>Bz LABEL_T2<br>AX = 0<br>LABEL_T2:<br>AX = AX * 2 |

(b) full replication of the control flow

| Original Code | T0 | T1 | T2 |
|---|---|---|---|
| SI = SI + D1 | SI = SI + D1 | CX = XC * 2 | |

| CX = CX *2<br>AX = AX +1<br>CX = CX + AX<br>BX[AllFlags] =AX + 1<br>Bz LABEL<br>CX = AX + BX<br>AX = 0<br>LABEL:<br>DX – SI*2<br>AX = AX*2 | DX = SI * 2<br>AX = AX + 1 | CX = CX + AX<br>BX[ALLFlags] =AX+1<br>Bz LABEL_T1<br>CX = AX + BX<br>LABEL_T1: | Bz LABEL_T2<br>AX = 0<br>LABEL_T2:<br>AX = AX * 2 |

(c) split computation of the control flow

Figure 5

Routine create_and_fill_matrix_at_current_level ()
initialize matrix M to all zeroes
for each node i identified as a delinquent load
    for each consumer node j of i based on data deps
        M[i] [j] = M[j] [i] = 0.1
    endfor
endfor compute slack of each edge
for all edges with a slack of 0 connecting nodes i & j
    if M[i] [j] = 0
        M[i] [j] = M[j] [i] = 2.0
    endif
endfor compute common pred. ratio F for all node pairs (i, j)
for each node pair (i, j)
    if M[i] [j] = M[j] [i] = F (i, j)
    endif
endfor Routine coarsening step ()
current_level = 0
while num_partitions > 2 do
    call create_and_fill_matrix_at_current_level ()
    current_level++
    call collapse_nodes ()
Done Routine collapse nodes ()
for each node pair (i, j) in any order
    collapse them if all the three conditions are met:
    (i) neither node i nor node j have been collapsed from previous
        level to current_level
    (ii) M[i] [j] ≥ 0.95*M[i] [k] for all nodes k
    (iii) M[i] [j] ≥ 0.95*M[k] [j] for all nodes k
endfor

Figure 10

SYSTEMS, METHODS, AND APPARATUSES TO DECOMPOSE A SEQUENTIAL PROGRAM INTO MULTIPLE THREADS, EXECUTE SAID THREADS, AND RECONSTRUCT THE SEQUENTIAL EXECUTION

PRIORITY CLAIM

This application claims the priority date of Provisional Patent Application Ser. No. 61/200,103, filed Nov. 24, 2008, entitled, "Method and Apparatus To Reconstruct Sequential Execution From A Decomposed Instruction Stream."

FIELD OF THE INVENTION

Embodiments of the invention relate generally to the field of information processing and, more specifically, to the field multithreaded execution in computing systems and microprocessors.

BACKGROUND

Single-threaded processors have shown significant performance improvements during the last decades by exploiting instruction level parallelism (ILP). However, this kind of parallelism is sometimes difficult to exploit and requires complex hardware structures that may lead to prohibitive power consumption and design complexity. Moreover, this increase in complexity and power provides diminishing returns. Chip multiprocessors (CMPs) have emerged as a promising alternative in order to provide further processor performance improvements under a reasonable power budget.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4 illustrates an example of two threads to be run in two processing cores with two data dependences among them shown as Data Dependence Graphs ("DDGs").

FIG. 5 shows three different examples of the outcome of thread partitioning when considering the control flow.

FIG. 10 illustrates an embodiment of a pseudo-code representation of a coarsening method.

DETAILED DESCRIPTION

Figure 1:
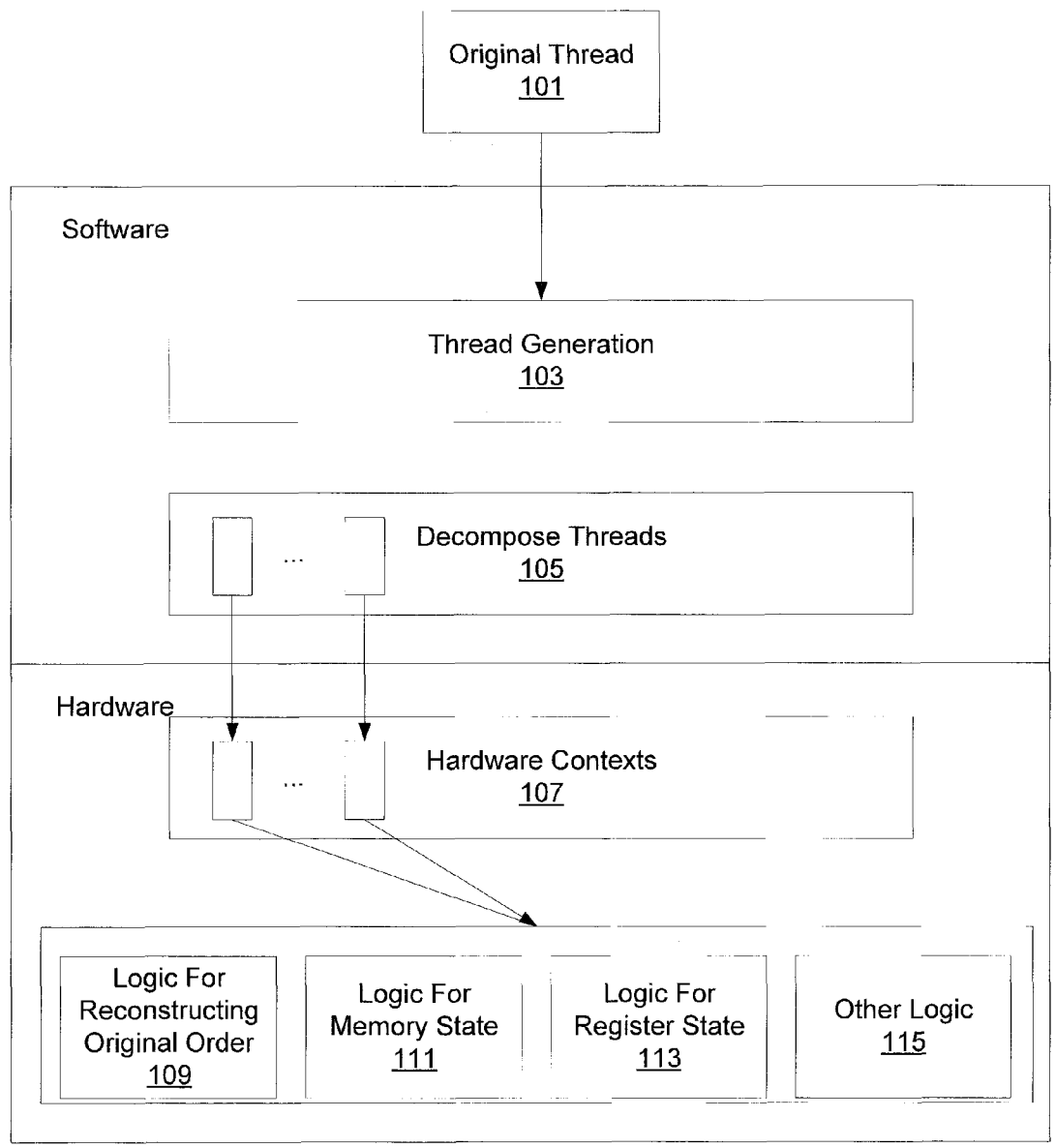
FIG. 1 is a block diagram illustrating hardware and software elements for at least one embodiment of a fine-grained multithreading system.

Embodiments of the invention pertain to techniques to decompose a sequential program into multiple threads or streams of execution, execute them in parallel, and reconstruct the sequential execution. For example, some of the embodiments described herein permit reconstructing the sequential order of instructions when they have been assigned arbitrarily to multiple threads. Thus, these embodiments described herein may be used with any technique that decomposes a sequential program into multiple threads or streams of execution. In particular, they may be used herein to reconstruct the sequential order of applications that have been decomposed, at instruction granularity, into speculative threads.

Speculative multithreading is a parallelization technique in which a sequential piece of code is decomposed into threads to be executed in parallel in different cores or different logical processors (functional units) of the same core. Speculative multithreading ("SpMT") may leverage multiple cores or functional units to boost single thread performance. SpMT supports threads that may either be committed or squashed atomically, depending on run-time conditions.

While discussed below in the context of threads that run on different cores, the concepts discussed herein are also applicable for a speculative multi-threading-like execution. That is, the concepts discussed herein are also applicable for speculative threads that run on different SMT logical processors of the same core.

Fine-Grain SpMT Paradigm

Speculative multithreading leverages multiple cores to boost single thread performance. It supports threads that can either commit or be squashed atomically, depending on run-time conditions. In traditional speculative multithreading schemes each thread executes a big chunk of consecutive instructions (for example, a loop iteration or a function call). Conceptually, this is equivalent to partition the dynamic instruction stream into chunks and execute them in parallel. However, this kind of partitioning may end up with too many dependencies among threads, which limits the exploitable TLP and harms performance. In fine-grain SpMT instructions may be distributed among threads at a finer granularity than in traditional threading schemes. In this sense, this new model is a superset of previous threading paradigms and it is able to better exploit TLP than traditional schemes.

Described below are embodiments of a speculative multithreading paradigm using a static or dynamic optimizer that uses multiple hardware contexts, i.e., processing cores, to speed up single threaded applications. Sequential code or dynamic stream is decomposed into multiple speculative threads at a very fine granularity (individual instruction level), in contrast to traditional threading techniques in which big chunks of consecutive instructions are assigned to threads. This flexibility allows for the exploitation of TLP on sequential applications where traditional partitioning schemes end up with many inter-thread data dependences that may limit performance. This also may improve the work balance of the threads and/or increase the amount of memory level parallelism that may be exploited.

In the presence of inter-thread data dependences, three different approaches to manage them are described: 1) use explicit inter-thread communications; 2) use pre-computation slices (replicated instructions) to locally satisfy these dependences; and/or 3) ignore them, speculating no dependence and allow the hardware to detect the potential violation. In this fine-grain threading, control flow inside a thread is managed locally and only requires including those branches in a thread that affect the execution of its assigned instructions. Therefore, the core front-end does not require any additional hardware in order to handle the control flow of the threads or to manage branch mispredictions and each core fetches, executes, and commits instructions independently (except for the synchronization points incurred by explicit inter-thread communications).

FIG. 1 is a block diagram illustrating hardware and software elements for at least one embodiment of a fine-grained multithreading system. The original thread 101 is fed into software such as a compiler, optimizer, etc. that includes a module or modules for thread generation 103. A thread, or regions thereof, is decomposed into multiple threads by a module or modules 105. Each thread will be executed on its own core/hardware context 107. These cores/contexts 107 are coupled to several different logic components such as logic for reconstructing the original program order or a subset thereof 109, logic for memory state 111, logic for register state 113, and other logic 115.

Figure 2:
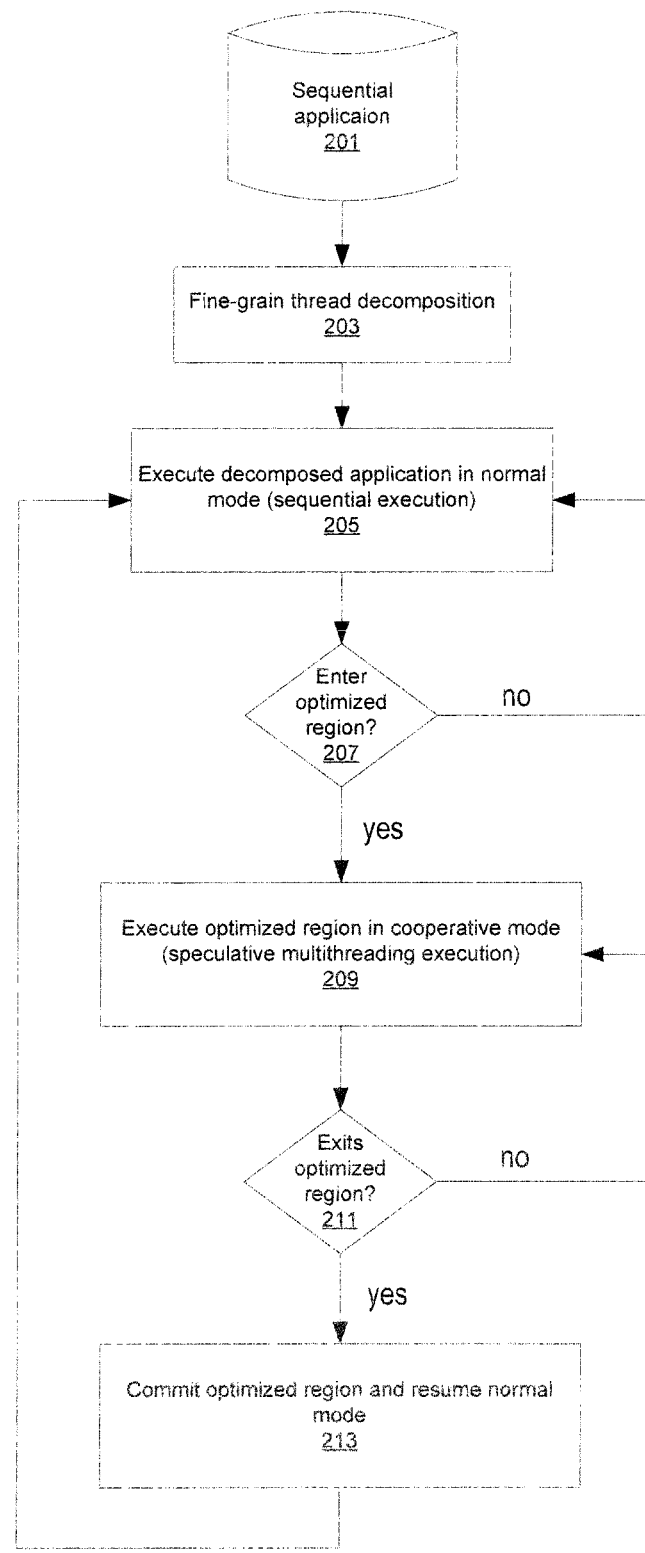
FIG. 2 illustrates an exemplary flow utilizing SpMT.

FIG. 2 illustrates an exemplary flow utilizing SpMT. At 201, a sequential application (program) is received by a compiler, optimizer, or other entity. This program may be of the form of executable code or source code.

At least a portion of the sequential application is decomposed into fine-grain threads forming one or more optimized regions at 203. Embodiments of this decomposition are described below and this may be performed by a compiler, optimizer, or other entity.

At 205, the sequential application is executed as normal. A determination of if the application should enter an optimized region is made at 207. Typically, a spawn instruction denotes the beginning of an optimized region. This instruction or the equivalent is normally added prior to the execution of the program, for example, by the compiler.

If the code should be processed as normal it is at 205. However, if there was a spawn instruction one or more threads are created for the optimized region and the program is executed in cooperative (speculative multithreading) mode at 209 until a determination of completion of the optimized region at 211.

Upon the completion of the optimized region it is committed and normal execution of the application continues at 213.

Fine-Grain Thread Decomposition

Fine-grain thread decomposition is the generation of threads from a sequential code or dynamic stream flexibly distributing individual instructions among them. This may be implemented either by a dynamic optimizer or statically at compile time.

Figure 3:
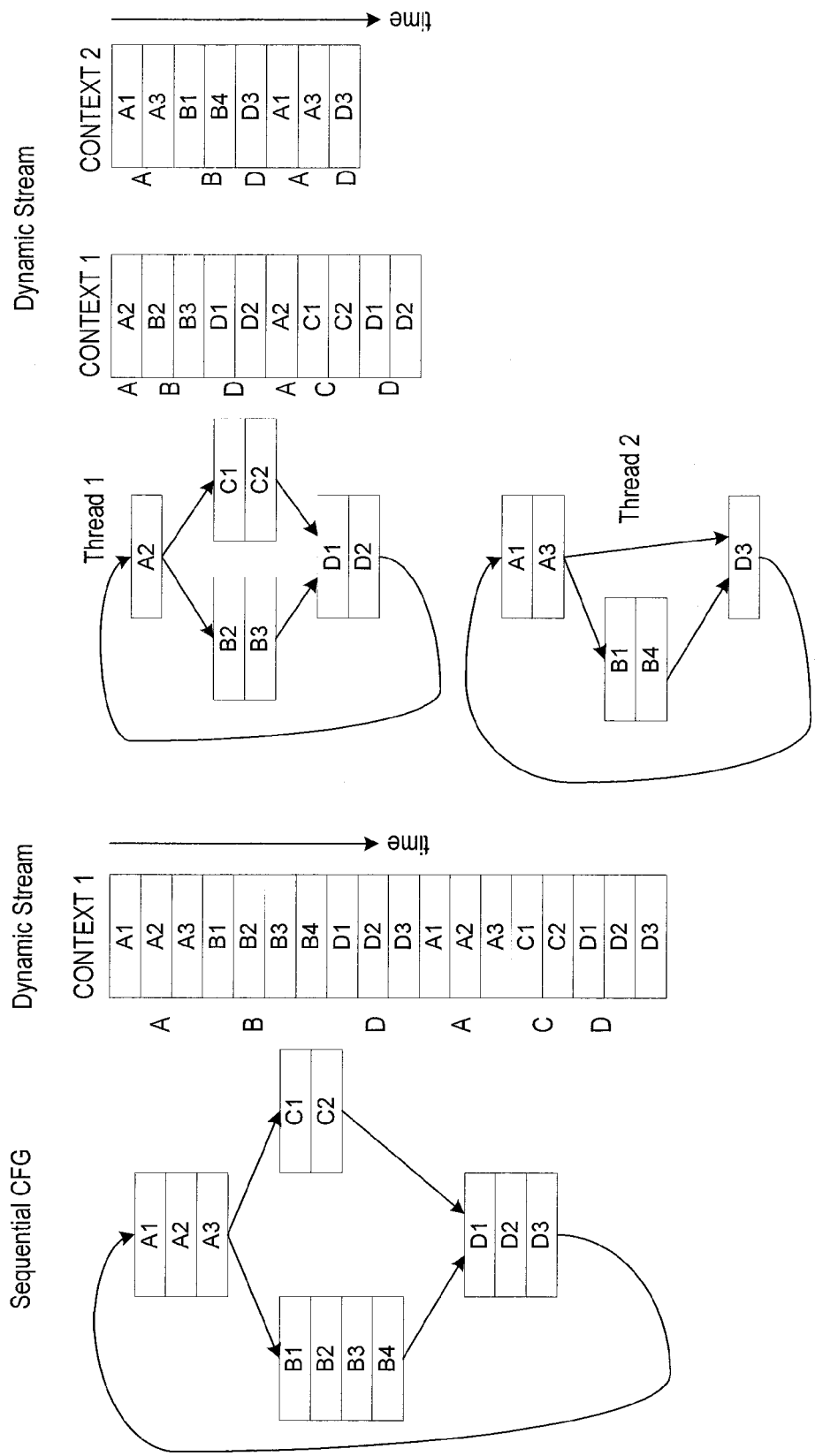
FIG. 3 illustrates an exemplary fine-grain thread decomposition of a small loop formed of four basic blocks.

FIG. 3 illustrates an exemplary fine-grain thread decomposition of a small loop formed of four basic blocks (A, B, C, and D). Each basic block consists of several instructions, labeled as Ai, Bi, Ci, and Di. The left side of the figure shows the original control-flow graph ("CFG") of the loop and a piece of the dynamic stream when it is executed in a context over time. The right side of the figure shows the result of one possible fine-grain thread decomposition into two threads each with its own context. The CFG of each resulting thread and its dynamic stream when they are executed in parallel is shown in the figure. This thread decomposition is more flexible than traditional schemes where big chunks of instructions are assigned to threads (typically, a traditional threading scheme would assign loop iterations to each thread). While a loop is shown in FIG. 3 as an example, the fine-grain thread decomposition is orthogonal to any high-level code structure and may be applied to any piece of sequential code or dynamic stream.

The flexibility to distribute individual instructions among threads may be leveraged to implement different policies for generating them. Some of the policies that may contribute to thread decomposition of a sequential code or dynamic stream and allow exploiting more thread level parallelism include, but are not limited to, one or more of the following: 1) instructions are assigned to threads to minimize the amount of inter-thread data dependences; 2) instructions are assigned to threads to balance their workload (fine-grain thread decomposition allows for a fine tuning of the workload balance because decisions to balance the threads may be done at instruction level); and 3) instructions may be assigned to threads to better exploit memory level parallelism ("MLP"). MLP is a source of parallelism for memory bounded applications. For these applications, an increase on MLP may result in a significant increase in performance. The fine-grain thread decomposition allows distributing load instructions among threads in order to increase MLP.

Inter-Thread Data Dependences Management

One of the issues of speculative multithreading paradigm is the handling of inter-thread data dependences. Two mechanisms are described below to solve the data dependences among threads: 1) pre-computation and 2) communication.

The first mechanism is the use of pre-computation slices ("pslice" for short) to break inter-thread data dependences and to satisfy them locally. For example, given an instruction "I" assigned to a thread T1 that needs a datum generated by a thread T2, all required instructions belonging to its pslice (the subset of instructions needed to generate the datum needed by I) that have not been assigned to T1, are replicated (duplicated) into T1. These instructions are referred to herein as replicated instructions. These replicated instructions are treated as regular instructions and may be scheduled with the rest of instructions assigned to a thread. As a result, in a speculative thread replicated instructions are mixed with the rest of instructions and may be reordered to minimize the execution time of the thread. Moreover, pre-computing a value does not imply replicating all instructions belonging to its pslice because some of the intermediate data required to calculate the value could be computed in a different thread and communicated as explained below.

Second, those dependences that either (i) may require too many replicated instructions to satisfy them locally or (ii) may be delayed a certain amount of cycles without harming execution time, are resolved through an explicit inter-thread communication. This reduces the amount of instructions that have to be replicated, but introduces a synchronization point for each explicit communication (at least in the receiver instruction).

FIG. 4 illustrates an example of two threads to be run in two processing cores with two data dependences among them shown as Data Dependence Graphs ("DDGs"). One of skill in the art will recognize, however, that the re-ordering embodiments described herein may be utilized with fine-grain multithreading that involves decomposition into larger numbers of threads and/or larger numbers of cores or logical processors on which to run the decomposed threads. In the figure, circles are instructions and arrows represent data dependences between two instructions.

On the left hand side is an original sequential control flow graph ("CFG") and a exemplary dynamic execution stream of instructions for the sequential execution of a loop. In this CFG, instructions "b" and "d" have data dependency on instruction "a."

The right hand side shows an exemplary thread decomposition for the sequential loop CFG of the left hand side. The two CFGs and two dynamic execution streams are created once the loop has been decomposed into two threads at instruction granularity (instruction D1 is replicated in both threads). This illustrates decomposed control flow graphs for the two decomposed threads and also illustrates the sample possible dynamic execution streams of instructions for the concurrent execution of decomposed threads of the loop. It is assumed for this that a spawn instruction is executed and the spawner and the spawnee threads start fetching and executing their assigned instructions without any explicit order between the two execution streams. The right hand side illustrates that knowing the order between two given instructions belonging to different thread execution streams in the example is not trivial. As can be seen, one dependence is solved through a pre-computation slice, which requires one replicated instruction ("a") in thread 1 and the other through an explicit communication (between "h" and "f").

Additional dependences may show up at run-time that were not foreseen at thread decomposition time. The system (hardware, firmware, software, and a combination thereof) that implements fine-grain SpMT should detect such dependence violations and squash the offending thread(s) and restart its/their execution.

For at least one embodiment, reconstruction of sequential execution from a decomposed instruction stream takes place in hardware. For some embodiments, this hardware function is performed by a Inter-Core Memory Coherency Module (ICMC) described in further detail below.

Control Flow Management

When using fine-grain SpMT, distributing instructions to threads at instruction granularity to execute them in parallel the control flow of the original sequential execution should be considered and/or managed. For example, the control flow may be managed by software when the speculative threads are generated. As such, the front-end of a processor using fine-grain SpMT does not require any additional hardware in order to handle the control flow of the fine-grain SpMT threads or to manage branch mispredictions. Rather, control speculation for a given thread is managed locally in the context it executes by using the conventional prediction and recovery mechanism on place.

In fine-grain SpMT, every thread includes all the branches it needs to compute the control path for its instructions. Those branches that are required to execute any instruction of a given thread, but were not originally included in that thread, are replicated. Note that not all the branches are needed in all the threads, but only those that affect the execution of its instructions. Moreover, having a branch instruction in a thread does not mean that all the instructions needed to compute this branch in the thread need to be included as well because the SpMT paradigm allows for inter-thread communications. For instance, a possible scenario is that only one thread computes the branch condition and it would communicate it to the rest of the threads. Another scenario is that the computation of the control flow of a given branch is completely spread out among all the threads.

FIG. 5 shows three different examples of the outcome of thread partitioning when considering the control flow. The instructions involved in the control flow are underlined and the arrows show explicit inter-thread communications. As it can be seen, the branch (Bz LABEL in the original code) has been replicated in all threads that need it (T1 and T2) in all three cases. In the case of a single control flow computation (a), the instructions that compute the branch are executed by T2 and the outcome sent to T1. In the full replication of the control flow (b), the computation is replicated in both threads (T1 and T2) and there is no need for an explicit communication. The computation of the branch is partitioned as any other computation in the program so it may be split among different threads that communicate explicitly (including threads that do not really care about the branch). An example of this is shown in the split computation of the control flow (c).

For at least one embodiment, the sequential piece of code may be a complete sequential program that cannot be efficiently parallelized by the conventional tools. For at least one other embodiment, the sequential piece of code may be a serial part of a parallelized application. Speculative multithreading makes a multi-core architecture to behave as a complexity-effective very wide core able to execute single-threaded applications faster.

For at least some embodiments described herein, it is assumed that an original single-threaded application, or portion thereof, has been decomposed into several speculative threads where each of the threads executes a subset of the total work of the original sequential application or portion. Such decomposition may be performed, for example, by an external tool (e.g., dynamic optimizer, compiler, etc.).

Generating Multiple Speculative Threads from a Single-Threaded Program

The phase of processing in which a sequential application is decomposed into speculative threads is referred to herein as "anaphase." For purposes of discussion, it will be assumed that such decomposition occurs at compile time. However, as is mentioned above, such decomposition may occur via other external tools besides a compiler (e.g., dynamic optimizer). SpMT threads are generated for those regions that cover most of the execution time of the application. In this section the speculative threads considered in this model are first described and the associated execution model and finally compiler techniques for generating them.

Inter-thread dependences might arise between speculative threads. These dependences occur when a value produced in one speculative thread is required in another. Inter-thread dependences may be detected at compile time by analyzing the code and/or using profile information. However, it may be that not all possible dependences are detected at compile time, and that the decomposition into threads is performed in a speculative fashion. For at least one embodiment, hardware is responsible for dealing with memory dependences that may occur during runtime among two instructions assigned to different speculative threads and not considered when the compiler generated the threads.

For all inter-thread dependences identified at compile time, appropriate code is generated in the speculative threads to handle them. In particular, one of the following techniques is applied: (i) the dependence is satisfied by an explicit communication; or (ii) the dependence is satisfied by a pre-computation slice (p-slice), that is the subset of instructions needed to generate the consumed datum ("live-ins"). Instructions included in a p-slice may need to be assigned to more than one thread. Therefore, speculative threads may contain replicated instructions, as is the case of instruction D1 in FIG. 3.

Finally, each speculative thread is self-contained from the point of view of the control flow. This means that each thread has all the branches it needs to resolve its own execution. Note that in order to accomplish this, those branches that affect the execution of the instructions of a thread need to be placed on the same thread. If a branch needs to be placed in more than one thread it is replicated. This is also handled by the compiler when threads are generated.

Figure 6:
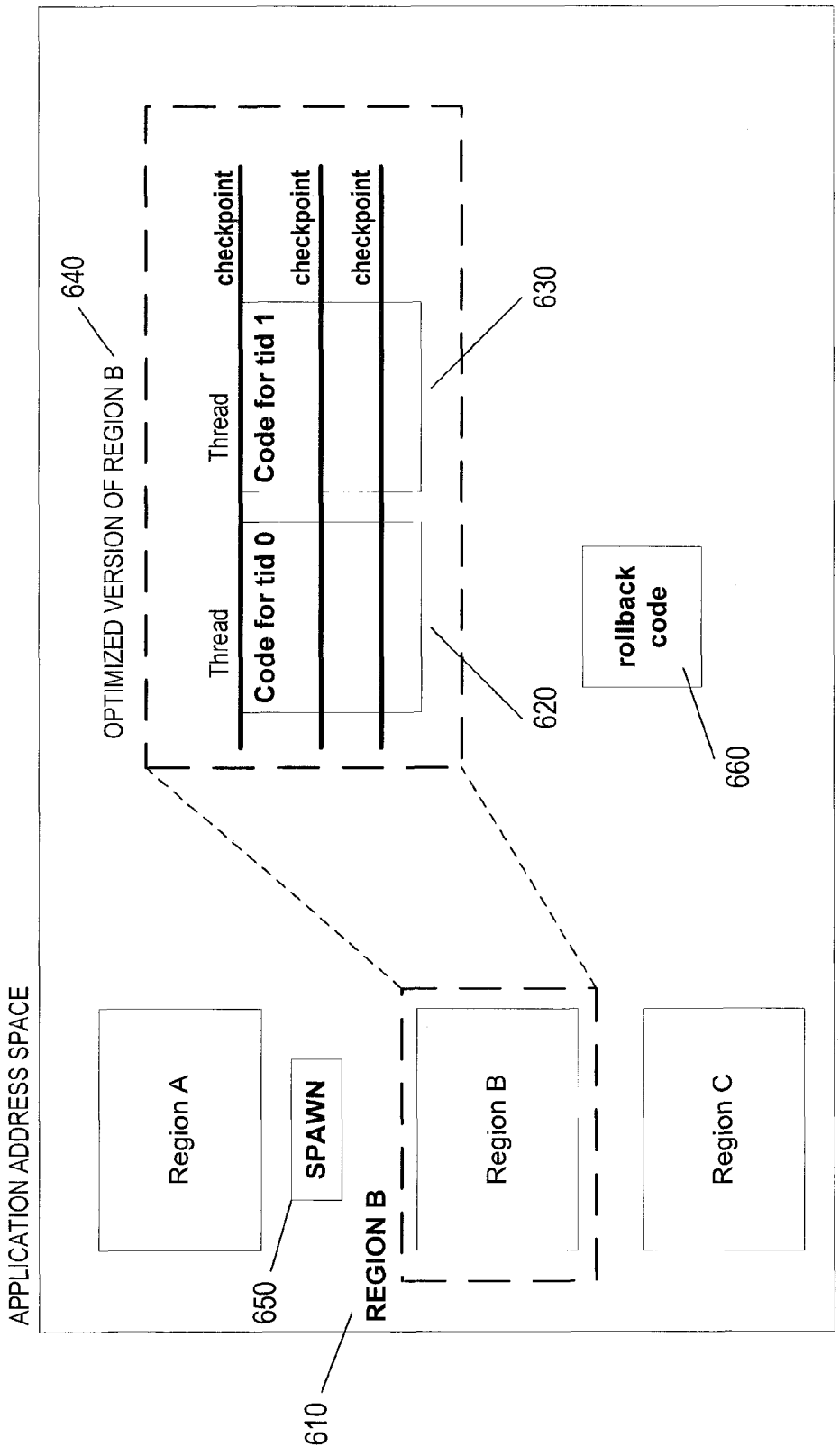
FIG. 6 illustrates an overview of the decomposition scheme of some embodiments.

Regarding execution, speculative threads are executed in a cooperative fashion on a multi-core processor such as illustrated below. In FIG. 6 an overview of the decomposition scheme of some embodiments is presented. For purposes of this discussion, it is assumed that the speculative threads (corresponding to thread id 0 ("tid 0") and thread id 1 ("tid 1")) are executed concurrently by two different cores (see, e.g., tiles of FIG. 15) or by two different logical processors of the same or different cores. However, one of skill in the art will realize that a tile for performing concurrent execution of a set of otherwise sequential instructions may include more than two cores. Similarly, the techniques described herein are applicable to systems that include multiple SMT logical processors per core.

As discussed above, a compiler or similar entity detects that a particular region (in this illustration region B 610) is suitable for applying speculative multithreading. This region 610 is then decomposed into speculative threads 620, 630 that are mapped somewhere else in the application code as the optimized version 640 of the region 610.

A spawn instruction 650 is inserted in the original code before entering the region that was optimized (region B 610). The spawn operation creates a new thread and both, the spawner and the spawnee speculative threads, start executing the optimized version 640 of the code. For the example shown, the spawner thread may execute one of the speculative threads (e.g., 620) while the spawnee thread may execute another (e.g., 630).

When two speculative threads are in a cooperative fashion, synchronization between them occurs when an inter-thread dependence is satisfied by an explicit communication. However, communications may imply synchronization only on the consumer side as far as appropriate communication mechanism is put in place. Regular memory or dedicated logic can be used for these communications.

On the other hand, violations, exceptions and/or interrupts may occur while in cooperative mode and the speculative threads may need to be rolled back. This can be handled by hardware in a totally transparent manner to the software threads or by including some extra code to handle that at compile time (see, e.g., rollback code 660).

When both threads reach the last instruction, they synchronize to exit of the optimized region, the speculative state becomes non-speculative, and execution continues with one single thread and the tile resumes to single-core mode. A "tile" as used herein is described in further detail below in connection with FIG. 15. Generally, a tile is a group of two or more cores that work to concurrently execute different portions of a set of otherwise sequential instructions (where the "different" portions may nonetheless include replicated instructions).

Speculative threads are typically generated at compile time. As such the compiler is responsible for: (1) profiling the application, (2) analyzing the code and detecting the most convenient regions of code for parallelization, (3) decomposing the selected region into speculative threads; and (4) generating optimized code and rollback code. However, the techniques described below may be applied to already compiled code. Additionally, the techniques discussed herein may be applied to all types of loops as well as to non-loop code. For at least one embodiment, the loops for which speculative threads are generated may be unrolled and/or frequently executed routines inlined.

Figure 7:
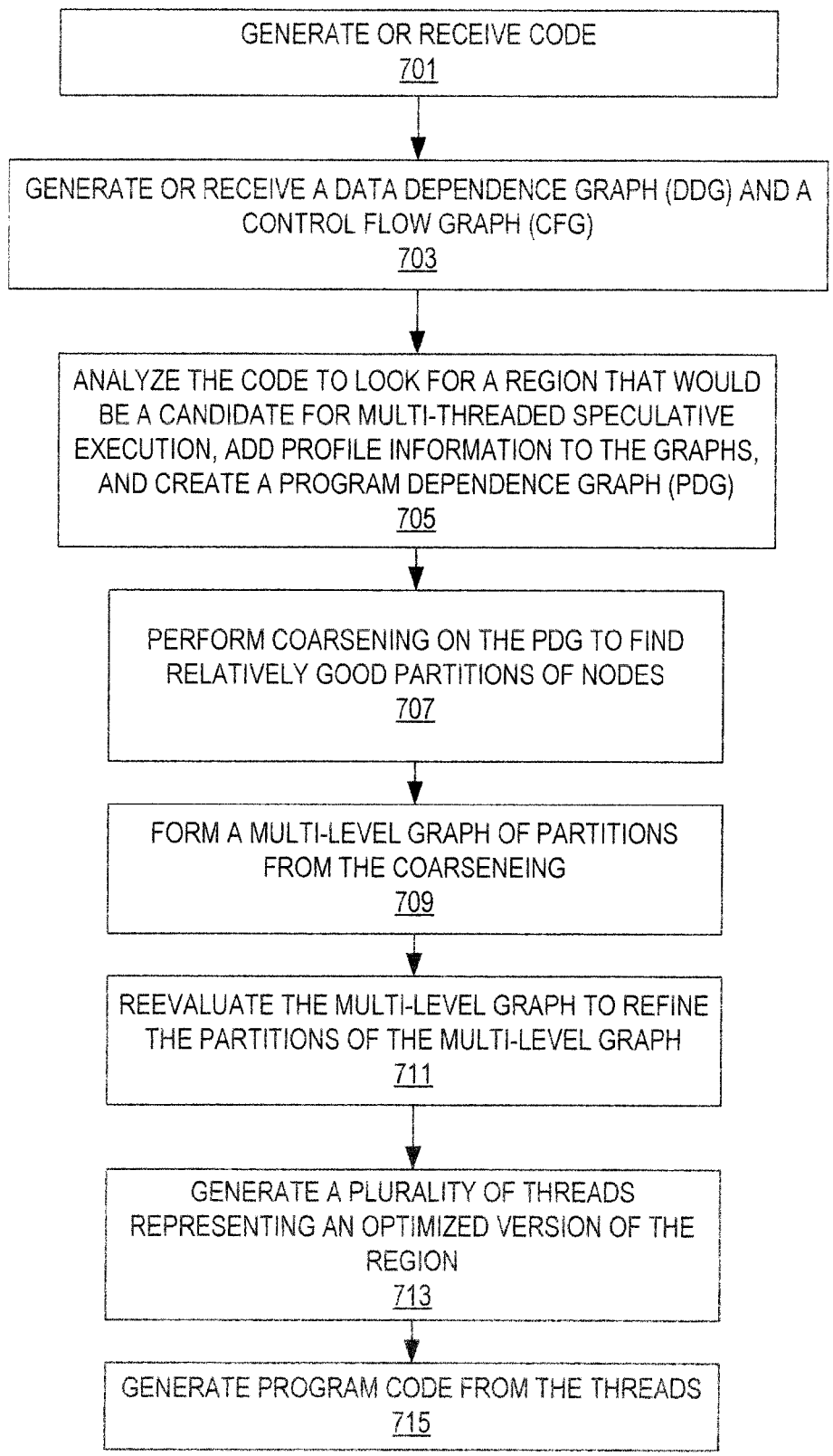
FIG. 7 illustrates an embodiment of a method for generating program code that utilizes fine-grain SpMT in an optimizer.

FIG. 7 illustrates an embodiment of a method for generating program code that utilizes fine-grain SpMT in an optimizer. At 701, the "original" program code is received or generated. This program code typically includes several regions of code.

The original program code is used to generate a data dependence graph (DDG) and a control flow graph (CFG) at 703. Alternatively, the DDG and CFG may be received by the optimizer.

These graphs are analyzed to look for one or more regions that would be a candidate for multi-threaded speculative execution. For example, "hot" regions may indicate that SpMT would be beneficial. As a part of this analysis, nodes (such as x86 instructions) and edges in the DDG are weighted by their dynamic occurrences and how many times data dependence (register or memory) occur between instructions, and control edges in the CFG are weighted by the frequency of the taken path. This profiling information is added to the graphs and both graphs are collapsed into program dependence graph (PDG) at 705. In other embodiments, the graphs are not collapsed.

In some embodiments, PDG is optimized by applying safe data-flow and control-flow code transformations like code reordering, constant propagation, loop unrolling, and routine specialization among others.

At 707 coarsening is performed. During coarsening, nodes (instructions) are iteratively collapsed into bigger nodes until there are as many nodes as desired number of partitions (for example, two partitions in the case of two threads). Coarsening provides relatively good partitions.

Figure 8:
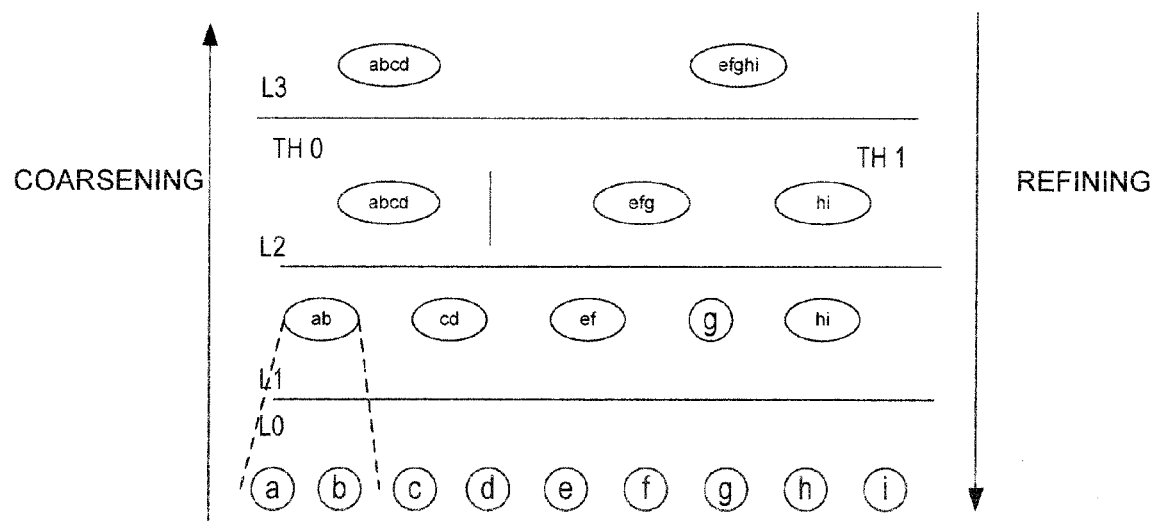
FIG. 8 illustrates an exemplary multi-level graph.

In the coarsening step, the graph size is iteratively reduced by collapsing pairs of nodes into supernodes until the final graph has as many supernodes as threads, describing a first partition of instructions to threads. During this process, different levels of supernodes are created in a multi-level graph (an exemplary multi-level graph is illustrated in FIG. 8). A node from a given level contains one or more nodes from the level below it. This can be seen in FIG. 8, where nodes at level 0 are individual instructions. The coarser nodes are referred to as supernodes, and the terms node and supernode interchangeably throughout this description. Also, each level has fewer nodes in such a way that the bottom level contains the original graph (the one passed to this step of the algorithm) and the topmost level only contains as many supernodes as threads desired to generate. Nodes belonging to a supernode are going to be assigned to the same thread.

In order to do so, in an embodiment a pair of nodes is chosen in the graph at level i to coarsen and a supernode built at level i+1 which contains both nodes. An example of this can be seen in FIG. 8, where nodes a and b at level 0 are joined to form node ab at level 1. This is repeated until all the nodes have been projected to the next level or there are no more valid pairs to collapse. When this happens, the nodes that have not been collapsed at the current level are just added to the next level as new supernodes. In this way, a new level is completed and the algorithm is repeated for this new level until the desired number of supernodes (threads) is obtained.

When coarsening the graph, for at least one embodiment the highest priority is given to the fusion of those instructions belonging to the critical path. In case of a tie, priority may be given to those instructions that have larger number of common ancestors. The larger the number of common ancestors the stronger the connectivity is, and thus it is usually more appropriate to fuse them into the same thread. On the other hand, to appropriately distribute workload among threads, very low priority is given to the fusion of: (1) nodes that do not depend on each other (directly or indirectly); and (2) delinquent loads and their consumers. Loads with a significant miss rate in the L2 cache during profiling may be considered as delinquent.

Figure 9:
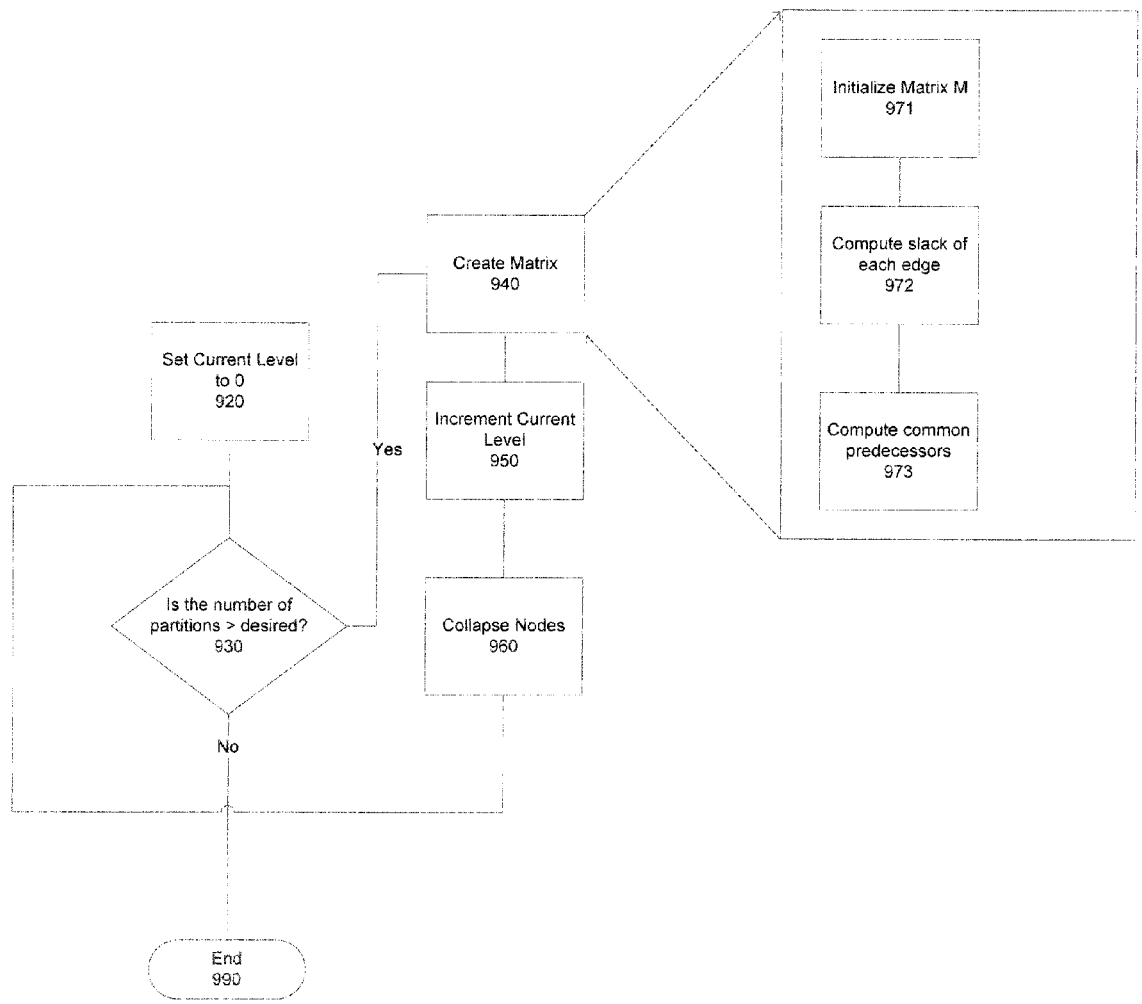
FIG. 9 illustrates an embodiment of a coarsening method.

FIG. 9 illustrates an embodiment of a coarsening method. At 920, a multi-level graph is created with the instructions of the region being at the first level of the multi-level graph and the current level of the multi-level graph is set to an initial value such as 0. Looking at FIG. 8, this would be L0 in the multi-level graph.

At 930, a decision of if the number of partitions is greater than the number of desired threads. For example, is the number of partitions greater than 2 (would three threads be created instead of two)?

If the number of partitions has been obtained then coarsening has been completed. However, if the number of partitions is greater than what is desired, a matrix is created at 940. Again, looking at FIG. 8 as an example, the number of partitions at level zero is nine and therefore a matrix would need to be created to create the next level (L1).

In an embodiment, the creation of the matrix includes three sub-routines. At 971, a matrix M is initialized and its values set to zero. Matrix M is built with the relationship between nodes, where the matrix position M[i,j] describes the relationship ratio between nodes i and j and M[i,j]=M[j,i]. Such a ratio is a value that ranges between 0 (worst ratio) and 2 (best ratio): the higher the ratio, the more related the two nodes are. After being initialized to all zeros, the cells of the matrix M are filled according to a set of predefined criteria. The first of such criteria is the detection of delinquent loads which are those load instructions that will likely miss in cache often and therefore impact performance. In an embodiment, those delinquent loads whose miss rate is higher than a threshold (for example, 10%) are determined. The formation of nodes with delinquent loads and their pre-computation slices is favored to allow the refinement (described later) to model these loads separated from their consumers. Therefore, the data edge that connects a delinquent load with a consumer is given very low priority. In an embodiment, the ratio of the nodes is fixed to 0.1 in matrix M (a very low priority), regardless of the following slack and common predecessor evaluations. Therefore, for those nodes in matrix M identified as delinquent nodes are given a value of 0.1. The pseudo-code representation of an embodiment of this is represented in FIG. 10.

At 972, the slack of each edge of the PDG is computed and the matrix M updated accordingly. Slack is the freedom an instruction has to delay its execution without impact total execution time. In order to compute such slack, first, the earliest dispatch time for each instruction is computed. For this computation, only data dependences are considered. Moreover, dependences between different iterations are ignored. After this, the latest dispatch time of each instruction is computed in a similar or same manner. The slack of each edge is defined as the difference between the earliest and the latest dispatch times of the consumer and the producer nodes respectively. The edges that do not have a slack in this way (control edges and inter-iteration dependences) have a default slack value (for example, 100). Two nodes i and j that are connected by an edge with very low slack are considered part of the critical path and will be collapsed with higher priority. Critical edges are those that have a slack of 0 and the rations M[I,j] and M[j,i] of those nodes are set to best ratio (for example, 2.0). The pseudo-code representation of this is represented in FIG. 10.

The remaining nodes of the matrix M are filled by looking at the common predecessors at 973. The number of predecessor instructions of each node pair (i,j) share is computed by traversing edges backwards. This helps assign dependent instructions to the same thread and independent instructions to different threads. In an embodiment, the predecessor relationship of each pair of nodes is computed as a ratio between the intersection of their antecessors and the union of their antecessors. The following equation defines the ratio (R) between nodes i and j:

$$R(i, j) = \frac{P(i) \cap P(j)}{P(i) \cup P(j)}$$

The functions P(i) and P(j) denotes the set of predecessors i or j, which include the nodes i or j. In an embodiment, Each predecessor instruction in P(i) is weighted by its profiled execution frequency to give more importance to the instructions that have a deeper impact on the dynamic instruction stream.

This ratio describes to some extent how related two nodes are. If two nodes share an important amount of nodes when traversing the graph backwards, it means that they share a lot of the computation and hence it makes sense to map them into the same thread. They should have a big relationship ratio in matrix M. On the other hand, if two nodes do not have common predecessor, they are independent and are good candidates to be mapped into different threads.

In the presence of recurrences, many nodes have a ratio of 1.0 (they share all predecessors). To solve these issues, the ratio is computed twice, once as usual, and a second time ignoring the dependences between different iterations (recurrences). The final ratio is the sum of these two. This improves the quality of the obtained threading and increases performance consequently. The final ratio is used to fill the rest of the cells of the matrix M. The pseudo-code representation of this is represented in FIG. 10.

Note that any of the three presented criteria may be turned on/off in order to generate good threads.

When matrix M has been filled at 940, the current level is incremented at 950 and the nodes are collapsed at 960. This collapse joins pairs of nodes into new supernodes. For each node pair, if the node pair meets a collection of conditions then they are collapsed. For example, in an embodiment, for a given node, a condition for collapse is that neither node i nor j have been collapsed from the previous level to the current level. An another embodiment, the value of M[i,j] should be at most 5% smaller than M[i,k] for any k and at most 5% smaller than M[I,j] for any one node. In other words, valid pairs are those with high ratio values, and a node can only be partnered with another node that is at most 5% worse than its best option. Those nodes without valid partners are projected to the next level, and one node can only be collapsed once per level.

After the collapse, the iterative process returns to the determination of the number of partitions at 930.

As the size of the matrix decrease, since a node may contain more than one node from level 0 (where the original nodes reside), all dependencies at level 0 are projected to the rest of the levels. For example, node ab at level 1 in FIG. 8 will be connected to node cd by all dependencies at level 0 between nodes a and b and nodes b and c. Therefore, matrix M is filled naturally at all levels.

Upon the completion of coarsening, a multi-level graph has been formed at 709. In an embodiment, this multi-level graph is reevaluated and refined at 711. Refinement is also an iterative process that walks the levels of the multi-level graph from the topmost level to the bottom-most and at each level tries to find a better partition by moving one node to another partition. An example of a movement may be seen in FIG. 8 where at level 2 a decision is made if node efg should be in thread 0 or 1. Refinement finds better partitions by refining the already "good" partitions found during coarsening. The studied partition in each refinement attempt, not only includes the decomposed instructions, but also all necessary branches in each thread to allow for their control independent execution, as well as all communications and p-slices required. Therefore, it is during the refinement process when the compiler decides how to manage inter-thread dependences.

At each level, the Kernighan-Lin (K-L) algorithm is used to improve the partition. The K-L algorithm works as follows: for each supernode n at level I, the gain of moving n to another thread tid F(n, tid) using an objective function is computed. Moving a supernode from one thread to another implies moving all level 0 nodes belonging to that supernode. Then the supernode with the highest F(n, tid) is chosen and moved. This is repeated until all the supernodes have been moved. Note that a node cannot be moved twice. Also note that all nodes are moved, even if the new solution is worse than the previous one based on the objective function. This allows the K-L algorithm to overcome local optimal solutions.

Once all the nodes have been moved, a round is complete at that level. If a level contains N nodes, there are N+1 solutions (partitions) during a round: one per node movement plus the initial one. The best of these solutions is chosen. If the best solution is different from the initial one (i.e. the best solution involved moving at least one node), then another round is performed at the same level. This is because a better solution at the current level was found other potential movements at the current level are explored. Note that the movements in a upper level, drag the nodes in the lower levels. Therefore, when a solution is found at level I, this is the starting point at level I−1. The advantage of this methodology is that a good solution can be found at the upper levels, where there are few nodes and the K-L algorithm behaves well. At the lower levels there are often too many nodes for the K-L to find a good solution from scratch, but since the algorithm starts with already good solutions, the task at the lower levels is just to provide fine-grain improvements. Normally most of the gains are achieved at the upper levels. Hence, a heuristic may be used in order to avoid traversing the lower levels to reduce the computation time of the algorithm if desired.

Thus, at a given level, the benefits or moving each node n to another thread is made by using an objective function, movement filtering, looking at inter-thread dependencies. In an embodiment, before evaluating a partition with the objective function, movement filtering and inter-thread dependency evaluation is performed.

Trying to move all nodes at a given level is costly, especially when there are many nodes in the PDG. The nodes may be first filtered to those that have a higher impact in terms of improving workload balance among threads and/or reduce inter-thread dependences. For improving workload balance, the focus is on the top K nodes that may help workload balance. Workload balance is computed by dividing the biggest estimated number of dynamic instructions assigned to a given thread by the total number of dynamic instructions assigned to a given thread by the total number of estimated dynamic instructions. A good balance between threads may be 0.5. The top L nodes are used to reduce the number of inter-thread dependences. In an embodiment, L and K are 10.

Before evaluating the partition derived by one movement, a decision on what to do with inter-thread dependences and whether some instructions should be replicated is made including a possible rearrangement of the control flow. These can be either communicated explicitly or pre-computed with instruction replication. Some control instructions have to be replicated in the threads in such a way that all the required branch instructions are in the threads that need them.

Before evaluating a particular partition, the algorithm decides how to manage inter-thread dependences. They can be: 1) fulfilled by using explicit inter-thread communications (communications can be marked with explicit send/receive instructions or by instruction hints and introduce a synchronization between the threads (at least at the receiver end)); 2) fulfilled by using pre-computation slices to locally satisfy these dependences (a pre-computation slice consists of the minimum instructions necessary to satisfy the dependence locally and these instructions can be replicated into the other core in order to avoid the communication); and/or 3) ignored, speculating no dependence if it is very infrequent and allow the hardware to detect the potential violation if it occurs.

Communicating a dependence is relatively expensive since the communicated value goes through a shared L2 cache (described below) when the producer reaches the head of the ROB of its corresponding core. On the other hand, an excess of replicated instructions may end up delaying the execution of the speculative threads and impact performance as well. Therefore, the selection of the most suitable alternative for each inter-thread dependence may have an impact on performance.

In an embodiment, a decision to pre-compute a dependence is affirmatively made if the weighted amount of instructions to be replicated does not exceed a particular threshold. Otherwise, the dependence is satisfied by an explicit communication. A value of 500 has been found to be a good threshold in our experiments, although other values may be more suitable in other environments and embodiments.

Given an inter-thread dependence, the algorithm may decide to explicitly communicate it if the amount of replicated dynamic instructions estimated to satisfy the dependence locally exceeds a threshold. Otherwise, the p-slice of the dependence may be constructed and replicated in the destination thread.

In order to appropriately define a valid threshold for each region, several alternative partitions are generated by the multilevel-graph partitioning approach varying the replication thresholds and the unrolling factor of the outer loop. Then, the best candidate for final code generation may be selected by considering the expected speedup. The one that has the largest expected speedup is selected. In case of a tie, the alternative that provides better balancing of instructions among threads is chosen.

During refinement, each partition (threading solution) has to be evaluated and compared with other partitions. The objective function estimates the execution time for this partition when running on a tile of a multicore processor. In an embodiment, to estimate the execution time of a partition, a 20,000 dynamic instruction stream of the region obtained by profiling is used. Using this sequence of instructions, the execution time is estimated as the longest thread based on a simple performance model that takes into account data dependencies, communication among threads, issues width resources, and the size of the ROB of the target core.

The completion of refinement results in a plurality of threads representing an optimized version of the region of code at 713. At 715 after the threads have been generated, the compiler creates the code to execute these threads. This generation includes inserting a spawn instruction at the appropriate point and mapping the instructions belonging to different threads in a different area of the logical address space and adjusting branch offsets accordingly.

Reconstructing Sequential Execution from a Decomposed Instruction Stream

As discussed above, an original single-threaded application is decomposed into several speculative threads where each of the threads executes a subset of the total work of the original sequential application. Even though the threads generated may be executed in parallel most of the time, the parallelization of the program may sometimes be incorrect because it was generated speculatively. Therefore, the hardware that executes these threads should be able to identify and recover from these situations. Such hardware mechanisms rely on buffering to hold the speculative state (for example, using explicit buffers, a memory hierarchy extended with additional states, etc.) and logic to determine the sequential order of instructions assigned to threads.

Determining/reconstructing the sequential order of speculative multithreading execution is needed for thread(s) validation and memory consistency. Sequential order violations that affect the outcome of the program should be detected and corrected (thread validation). For instance, loads that read a stale value because the store that produced the right value was executed in a different core. Additionally, external devices and software should see the execution of the speculative threads as if the original application had been executed in sequential order (memory consistency). Thus, the memory updates should be visible to the network interconnection in the same order as they would be if the original single-threaded application was executed.

In one embodiment, speculative multithreading executes multiple loop iterations in parallel by assigning a full iteration (or chunks of consecutive iterations) to each thread. A spawn instruction executed in iteration i by one core creates a new thread that starts executing iteration i+1 in another core. In this case, all instructions executed by the spawner thread are older than those executed by the spawnee. Therefore, reconstructing the sequential order is straightforward and threads are validated in the same order they were created.

In embodiments using fine-grain speculative multithreading, a sequential code is decomposed into threads at instruction granularity and some instructions may be assigned to more than just one thread (referred to as replicated instructions). In embodiments using fine-grain speculative multithreading, assuming two threads to be run in two cores for clarity purposes, a spawn instruction is executed and the spawner and the spawnee threads start fetching and executing their assigned instructions without any explicit order between the two. An example of such a paradigm is shown in FIG. 3, where the original sequential CFG and a possible dynamic stream is shown on the left, and a possible thread decomposition is shown on the right. Note that knowing the order between two given instruction is not trivial.

Embodiments herein focus on reconstructing the sequential order of memory instructions under the assumptions of fine-grain speculative threading. The description introduced here, however, may be extrapolated to reconstruct the sequential ordering for any other processor state in addition to memory. In a parallel execution, it is useful to be able to reconstruct the original sequential order for many reasons, including: supporting processor consistency, debugging, or analyzing a program. A cost-effective mechanism to do so may include one or more of the following features: 1) assignment of simple POP marks (which may be just a few bits) to a subset of static instructions (all instructions need not necessarily be marked; just the subset that is important to reconstruct a desired order); and 2) reconstruction of the order even if the instructions have been decomposed into multiple threads at a very fine granularity (individual instruction level).

As used herein, "thread order" is the order in which a thread sees its own assigned instructions and "program order" is the order in which all instructions looked like in the original sequential stream. Thread order may be reconstructed because each thread fetches and commits its own instructions in order. Hence, thread ordering may be satisfied by putting all instructions committed by a thread into a FIFO queue (illustrated in FIG. 11): the oldest instruction in thread order is the one at the head of the FIFO, whereas the youngest is the one at the tail. Herein, the terms "order," "sequential order," and "program order" are used interchangeably.

Arbitrary assignment of instructions to threads is possible in fine-grain multithreading with the constraint that an instruction must belong to at least one thread. The extension of what is discussed herein in the presence of deleted instructions (instructions deleted by hardware or software optimizations) is straightforward, as the program order to reconstruct is the original order without such deleted instructions.

Figure 11:
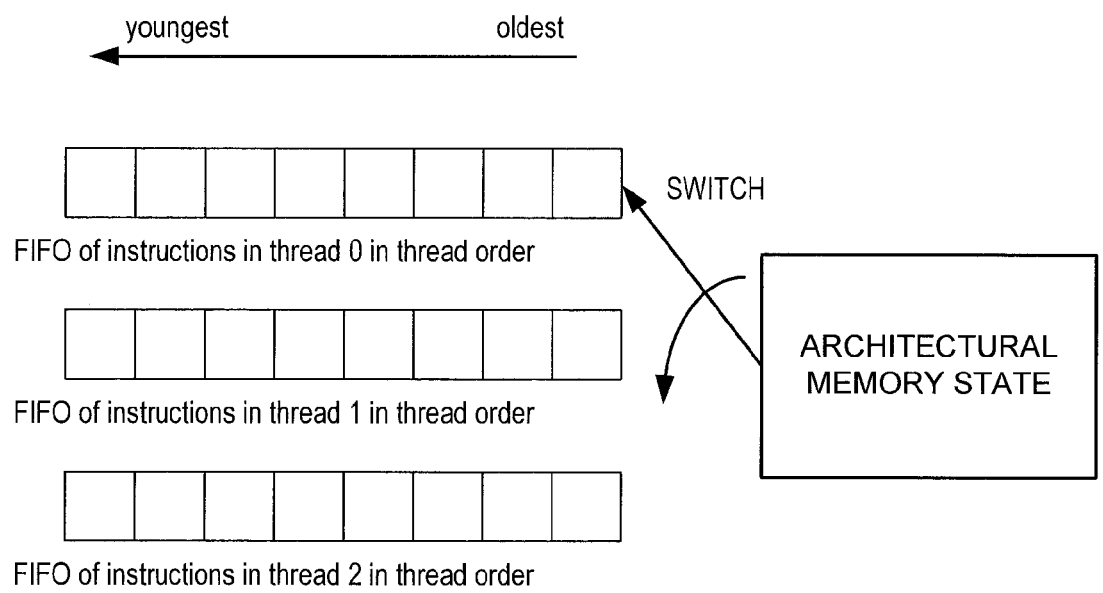
FIG. 11 illustrates an embodiment of threads being committed into FIFO queues.

Program order may be reconstructed by having a switch that selects the thread ordering FIFO queues in the order specified by the POP marks, as shown in FIG. 11. Essentially, the POP marks indicate when and which FIFO the switch should select. Each FIFO queue has the ordering instructions assigned to a thread in thread order. Memory is updated in program order by moving the switch from one FIFO queue to another orchestrated by POP marks. At a given point in time, memory is updated with the first ordering instruction of the corresponding FIFO queue. That instruction is then popped from its queue and its POP value is read to move the switch to the specified FIFO queue.

Where the first ordering instruction in the sequential program order resides in order should be known so as to provide a starting point. POP pointers may describe a characteristic of the next ordering instruction and the first one does not have any predecessor ordering instruction. This starting mark is encoded in a register for at least one embodiment. Alternatively, the first ordering instruction is assigned to a static FIFO queue. One of skill in the art will realize that many other implementations to define the first mark are within the scope of embodiments described.

Using embodiments of mechanisms described herein, memory may be updated in sequential program order. However, other embodiments may be extended easily to any parallel paradigm in which a specific order is to be enforced by adding marks to the static program.

For various embodiments, the entity to mark ordering instructions may be a compiler, a Dynamic Binary Optimizer (DBO), or a piece of hardware. The entity to map the logical identifiers of threads specified by the POP marks to physical threads (OS threads, hardware threads, . . . ) may be the OS, or a piece of hardware, to name a few embodiments. If the marks are defined at user level or the OS level, they will be visible through either part of the instruction coding or in a piece of hardware visible to the user (memory, specific user-visible buffer, etc.). If the marks are defined by hardware, it is assumed that the hardware has knowledge of the static control flow of the program. Thus, for at least some embodiments that defines the marks in hardware use a hardware/software hybrid approach to use software to inform the hardware of the control flow.

In a piece of code without control flow (for example, a basic block), one can determine the order of store instructions. A store $S_i$ assigned to thread 0 that is before the next store $S_{i+1}$ in program order which is assigned to thread 1 will have a POP of 1, meaning that the next ordering instruction has been assigned to thread 1. These POPs mark the proper order in the presence of any kind of code (hammocks, loops, . . . ). Branch instructions are marked with two POPs, one indicating the thread containing the next ordering instruction in program order when the branch is taken, and another indicating the same when the branch is not taken. Finally, not all stores neither all branches need to be marked by POPs, depending on the assignment of instructions to threads.

Typically, only some of the store instructions and some of the branches are marked if POP marks are marks indicating a change from one FIFO queue to another FIFO queue—if there is not POP value attached to an ordering instruction, it means that the next ordering instruction resides in the same FIFO queue (it has been assigned to the same thread). However, all ordering instructions could be marked for one or more embodiments that desire a homogeneous marking of instructions. For the exemplary embodiment described herein, it is assumed that not all ordering instructions need to be marked. This is a superset of the embodiments that mark all ordering instructions, in that the sample embodiment requires more complex logic.

It should be noted that a "fake" ordering instruction may be designed not to have architectural side effects. Alternatively, embodiments may employ "fake" ordering instructions that do have architectural side-effects as long as these effects are under control. For example, it may be an instruction like "and rax, rax" if rax is not a live-in in the corresponding basic block and it is redefined in it.

Instructions that are assigned to multiple threads are "replicated instructions" as discussed above. Managing replicated instructions may be handled in a straightforward manner. The order among the individual instances of the same instruction is irrelevant as long as the order with respect to the rest of the ordering instructions is maintained. Hence, any arbitrary order among the instances may be chosen. The order that minimizes the amount of needed POP marks may be used if this is really an issue. For instance, if an instruction I is assigned to threads 0, 1, 2, valid orders of the three instances are $I_0, I_1, I_2$, (where the number represents the thread identifier) or $I_2, I_0, I_1$, or any other as long as POP pointers are correct with respect to previous and forthcoming ordering instructions.

During the code generation of the optimized region Program Order Pointers (POPs) are generated and inserted to the optimized code. In fine-grain speculative multithreading, the relative order of the instructions that are useful for reconstructing the desired sequential order are marked. These instructions are "ordering instructions." Since embodiments of the current invention try to reconstruct memory ordering to update memory correctly, store instructions and branches are examples of ordering instructions. Ordering instructions may be marked with N bits (where $N = \lceil \log_2 M \rceil$, M being the number of threads) that code the thread ID containing the next ordering instruction in sequential program order. POP marks may be encoded with instructions as instruction hints or reside elsewhere as long as the system knows how to map POP marks with instructions.

Figure 12:
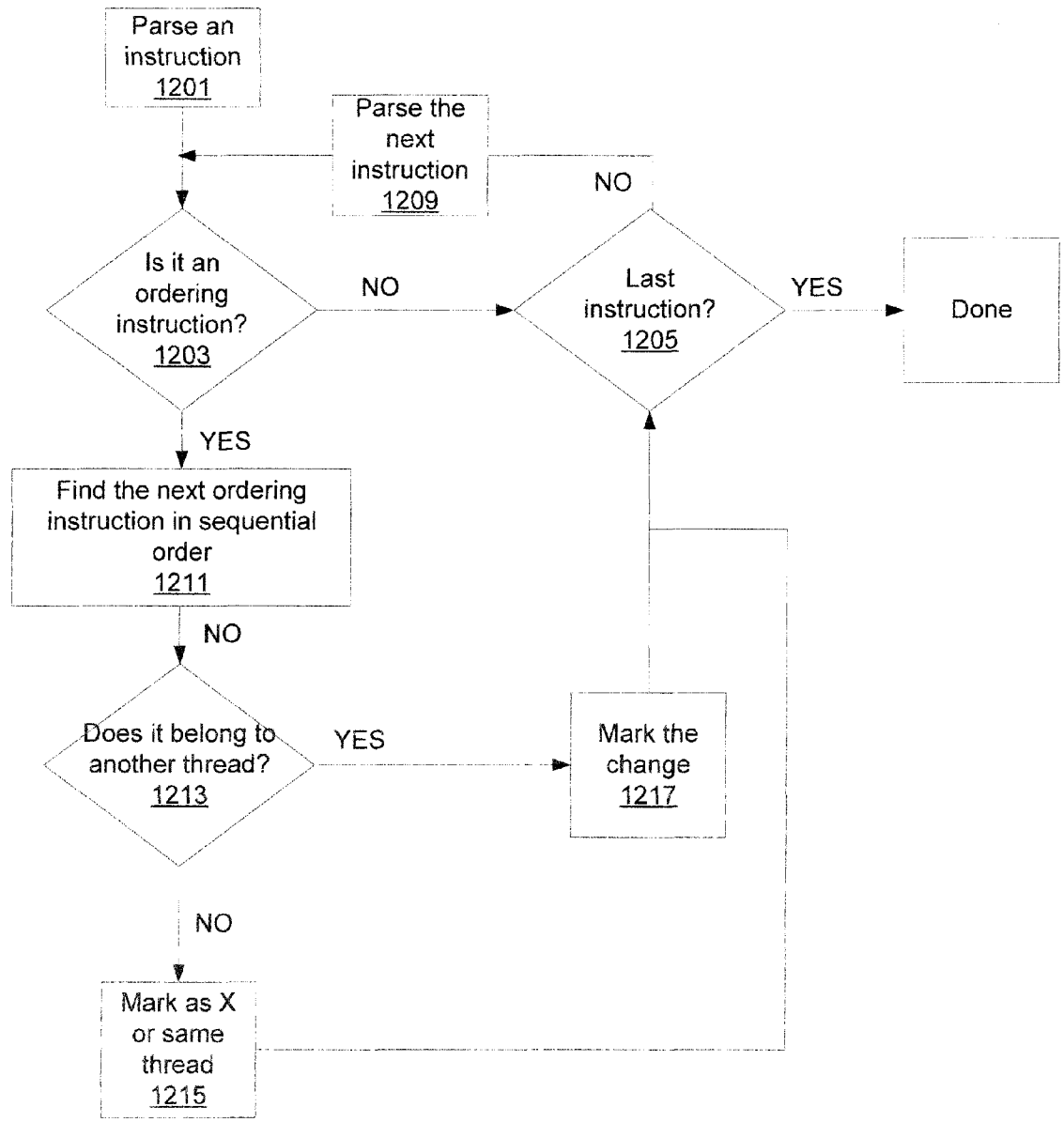
FIG. 12 illustrates an embodiment of a method for determining POP marks for an optimized region.

FIG. 12 illustrates an embodiment of a method for determining POP marks for an optimized region. An instruction of the region is parsed at 1201. This instruction may be the first of the optimized region or some instruction that occurs after that instruction.

A determination of if this instruction is an ordering instruction is made at 1203. If the instruction is not an ordering instruction it will not receive a POP mark and a determination is made of whether this is the last instruction of the optimized region. In some embodiments, POP marks are created for all instructions. If the instruction is not the last instruction, then the next instruction of the region is parsed at 1209.

If the instruction was an ordering instruction, the region is parsed for the next ordering instruction in sequential order with the ordering instruction at 1211. A determination of if that subsequent ordering instruction belongs to a different thread is made at 1213. If that subsequent ordering instruction does belong to a different thread, then a POP mark indicating the thread switch is made at 1217 and a determination of if that was the last instruction of the thread is made at 1205.

If the subsequent ordering instruction did not belong to another thread, then this previous ordering instruction found at 1203 is marked as belong to the same thread. In some embodiments this marking is an "X" and in others the POP mark remains the same as the previous ordering instruction.

In some embodiments there are preset rules for when to assign a different POP value. For example, in some embodiments, given a store instruction $S_i$ assigned to thread $T_i$: 1) $S_i$ will be marked with a POP value $T_j$ if there exists a store $S_j$ following $S_i$ assigned to thread $T_j$ with no branch in between, being $T_j$ and $T_i$ different; 2) $S_i$ will be marked with a POP value $T_j$ if there is no other store S between $S_i$ and the next branch B assigned to thread $T_j$, being $T_i$ and $T_j$ different; and 3) Otherwise, there is no need to mark store $S_i$.

In some embodiments, given a conditional branch instruction $B_i$ assigned to thread $T_i$: 1) $B_i$ is marked with a POP value $T_j$ in its taken POP mark if the next ordering instruction when the branch is taken (it can be a branch or a store) is assigned to $T_j$, being $T_i$ different than $T_j$. Otherwise, there is no need to assign a taken POP mark to $B_i$; 2) $B_i$ is marked with a POP value $T_j$ in its fallthru POP mark if the next ordering instruction when the branch is not taken (it can be a branch or a store) is assigned to $T_j$, being $T_i$ different than $T_j$. Otherwise, there is no need to assign a fallthru POP mark to $B_i$.

In some embodiments, given an unconditional branch $B_i$ assigned to thread $T_i$ the same algorithm as a conditional branch is applied, but only a computation of the taken POP value is made.

In some embodiments, given an ordering instruction in $T_i$ followed by an indirect branch with N possible paths $P_1 \ldots P_n$ and without any ordering instruction in between, the paths $P_k$ where the next ordering instruction belongs to a thread $T_j$ different than $T_i$ will execute a "fake" ordering instruction in $T_i$ with a POP value $T_j$. A fake ordering instruction is just an instruction whose sole purpose is to keep the ordering consistent. It can be a specific instruction or a generic opcode as long as it has no architectural side-effects.

Figure 13:
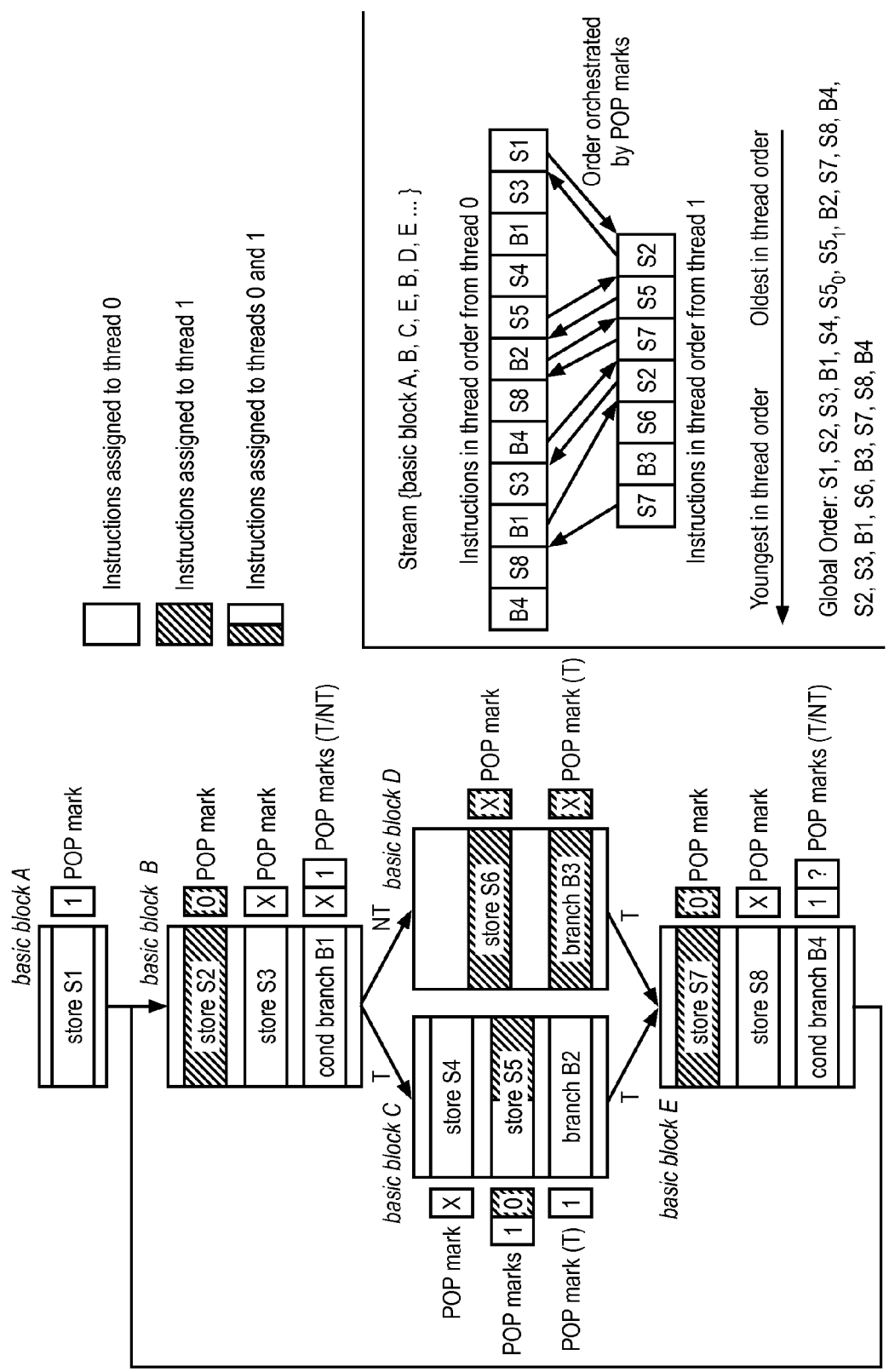
FIG. 13 illustrates an example using a loop with a hammock.

FIG. 13 illustrates an example using a loop with a hammock. In this embodiment, the program order may be reconstructed and the ordering instructions are stores and branches. For the sake of simplicity, only ordering instructions are shown, but one of skill in the art will recognize that other instructions are present. Ordering instructions illustrated in F13 are marked in indicating whether they have been assigned to thread 0 or 1 respectively. Conditional branches have two POP marks, while stores and unconditional branches have only one. A POP mark of "X" means that this mark is not needed. A POP mark of "?" means unknown because the complete control flow is not shown. On the bottom right part, it is shown how the program order is reconstructed when the loop is executed twice, each iteration following a different path of the hammock. For the sake of simplicity it has been assumed that the code is decomposed into two threads although the mechanism is intended to work with an arbitrary number of threads albeit enough bits are provided for the POP marks. Furthermore, only ordering instructions are depicted.

Store instruction S5 has been assigned to both threads and has two pop marks. All other stores have one POP mark. Unconditional branches have also one POP mark (the taken one T). Conditional branches have two POP marks: one for taken (T) and one for not taken (NT). The first instruction, store S1, is assigned to thread 0 and has a POP value of 1 since the next ordering instruction in sequential order S2 is assigned to thread 1. Store S3 does not need a POP value (thus, the "X") because the next ordering instruction in sequential order is assigned to the same thread 0. Thus, there is not a need to encode a mark indicating a change from one FIFO queue to another. Conditional branch B1 does not need a taken POP value because when the branch is taken, the next ordering instruction is assigned to the same thread 0. However, B1 does need a not taken POP value because when the branch is not taken, the next ordering instruction S6 has been assigned to the other thread. In this case, the mark is 1. As another particular case, store S5 has been assigned to both threads (it has been replicated). In this case, the order between its two instances is not relevant. In the figure, the instance of S5 in thread 0 goes before the instance in thread 1 by not assigning a POP pointer to store S4 in thread 0 and by assigning POP pointers 1 and 0 to S5 instances in thread 0 and 1 respectively. However, it could have been the other way around although POP values would be different.

The bottom right part of FIG. 13 illustrates how ordering instructions are related by using the POP pointers assuming that the program follows the execution stream composed of {basic block A, B, C, E, B, D, E . . . }. In this part of the figure, a line leaving from the center of a box X means "after executing the instruction in X", while the arrowed line arriving at the beginning of a box X means "before executing the instruction in X." This program flow includes running through the loop twice, wherein each iteration through the loop follows a different path of the hammock. Thus, the global order is S1, S2, S3, B1, S4, $S5_0$, $S5_1$, B2, S7, S8, B4, S2, B1, S6, . . . .

Described above are embodiments that mark store instructions and branches that have been arbitrarily assigned to threads in order to update memory with the proper sequential program order. For at least one embodiment, the decomposed threads are constructed at the instruction level, coupling the execution of cores to improve single-thread performance in a multi-core design. The embodiments of hardware mechanisms that support the execution of threads generated at compile time are discussed in detail below. These threads result from a fine-grain speculative decomposition of the original application and they are executed under a modified multi-core system that includes: (1) a mechanism for detecting violations among threads; (2) a mechanism for reconstructing the original sequential order; and (3) a checkpointing and a recovery mechanism to handle misspeculations.

Embodiments speed up single-threaded applications in multi-core systems by decomposing them in a fine-grain fashion. The compiler is responsible for distributing instructions from a single-threaded application or sequential regions of a parallel application into threads that can execute in parallel in a multicore system with support for speculative multithreading. One of skill in the art will recognize that this may be extended to reconstruct any kind of order given a parallelized code. Some alternative embodiments include, but are not limited to, 1) reconstructing the control flow (ordering instructions are only branches); 2) reconstructing the whole program flow (all instructions are ordering instructions and should have an assigned POP mark); 3) reconstructing the memory flow (branches, loads and stores are ordering instructions); 4) forcing a particular order of instructions of a parallel program in order to validate, debug, test, or tune it (starting from an already parallelized code, the user/compiler/analysis tool assigns POP marks to instructions for forcing a particular order among instructions and sees how the sequential view of the program look at each point).

Figure 14:
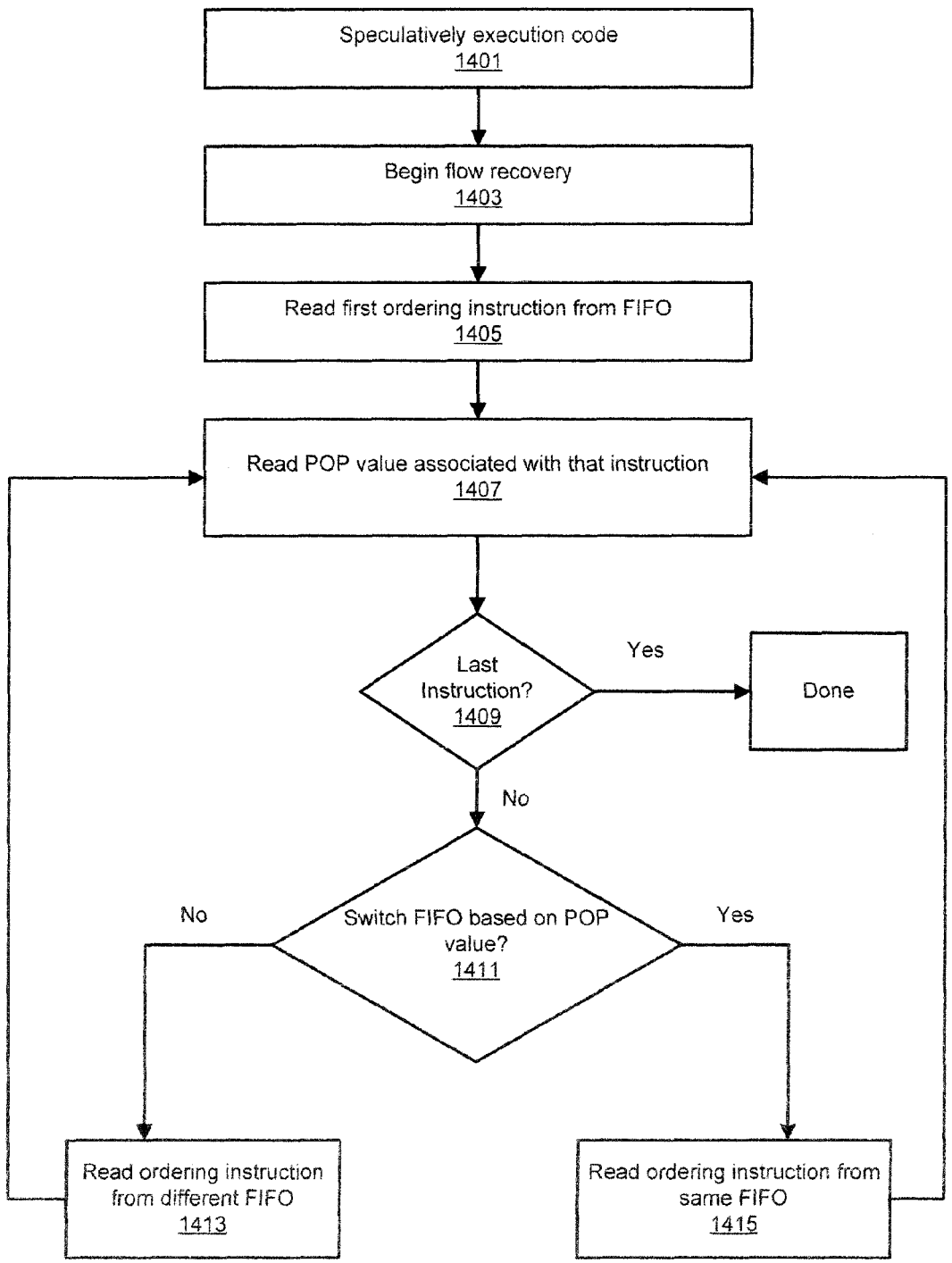
FIG. 14 illustrates an embodiment of a method to reconstruct a flow using POP marks.

An embodiment of a method to reconstruct a flow using POP marks is illustrated in FIG. 14. As detailed above, the ordering instructions used to reconstruct a program flow are stores and branches. At 1401, a program is speculatively executed using a plurality of cores. During this execution, the instructions of each thread are locally retired in the thread that they are assigned to and globally retired by the MLC via the ICMC.

At 1403, a condition is been found which requires that a flow (program, control, memory, etc.) be recovered or reconstructed. For example, an inconsistent memory value between the cores executing the optimized region has been found. Of course, the flow could be reconstructed for other reasons such as fine tuning which is not a condition found during execution.

At 1405, the first (oldest) ordering instruction is retrieved from the appropriate FIFO (these FIFO are called memFIFOs or memory FIFO queues) below and are populated as the program executes). The location of this instruction may be indicated by one of the ways described above. Using the loop with a hammock discussed earlier as an example, the first instruction is store s1 and it belongs to thread 0. As instructions are retired, the instruction including its POP value(s) is stored in the appropriate FIFO or another location identifiable by the mechanism reconstructing the flow.

At 1407, the POP value of that instruction is read. Again, looking at FIG. 4, the POP mark value for the store s1 instruction is a "1."

A determination of whether or not this is the last ordering instruction is made at 1409. If it is, then the flow has been determined. If not, a determination of whether or not to switch FIFOs is made at 1411. A switch is made if the POP value is different than the thread of the previously retrieved instruction. In a previous example, the read value of "1" indicates that the next program flow instruction belongs to thread 1 which is different than the store s1 instruction which belonged to thread 0. If the value was an X it would indicate that the next program flow instruction belongs to the same thread and there would be no FIFO switch. In a previous example, this occurs after the store s3 branch is retrieved.

If a switch is to be made, the FIFO indicated by the POP value is selected and the oldest instruction in that FIFO is read along with its POP value at 1413. If no switch is to be made, then the FIFO is not switched and the next oldest instruction is read from the FIFO at 1415. The process of reading instructions and switching FIFOs based on the read POP values continues until the program flow has been recreated or the FIFOs are exhausted. In an embodiment, the FIFOs are replenished from another storage location (such as main memory) if they are exhausted. In an embodiment, execution of the program continues by using the flow to determine where to restart the execution of the program.

In an embodiment, the ICMC described below performs the above method. In another embodiment, a software routine performs the above method.

Embodiments of Multi-Core Speculative Multithreading Processors and Systems

Figure 15:
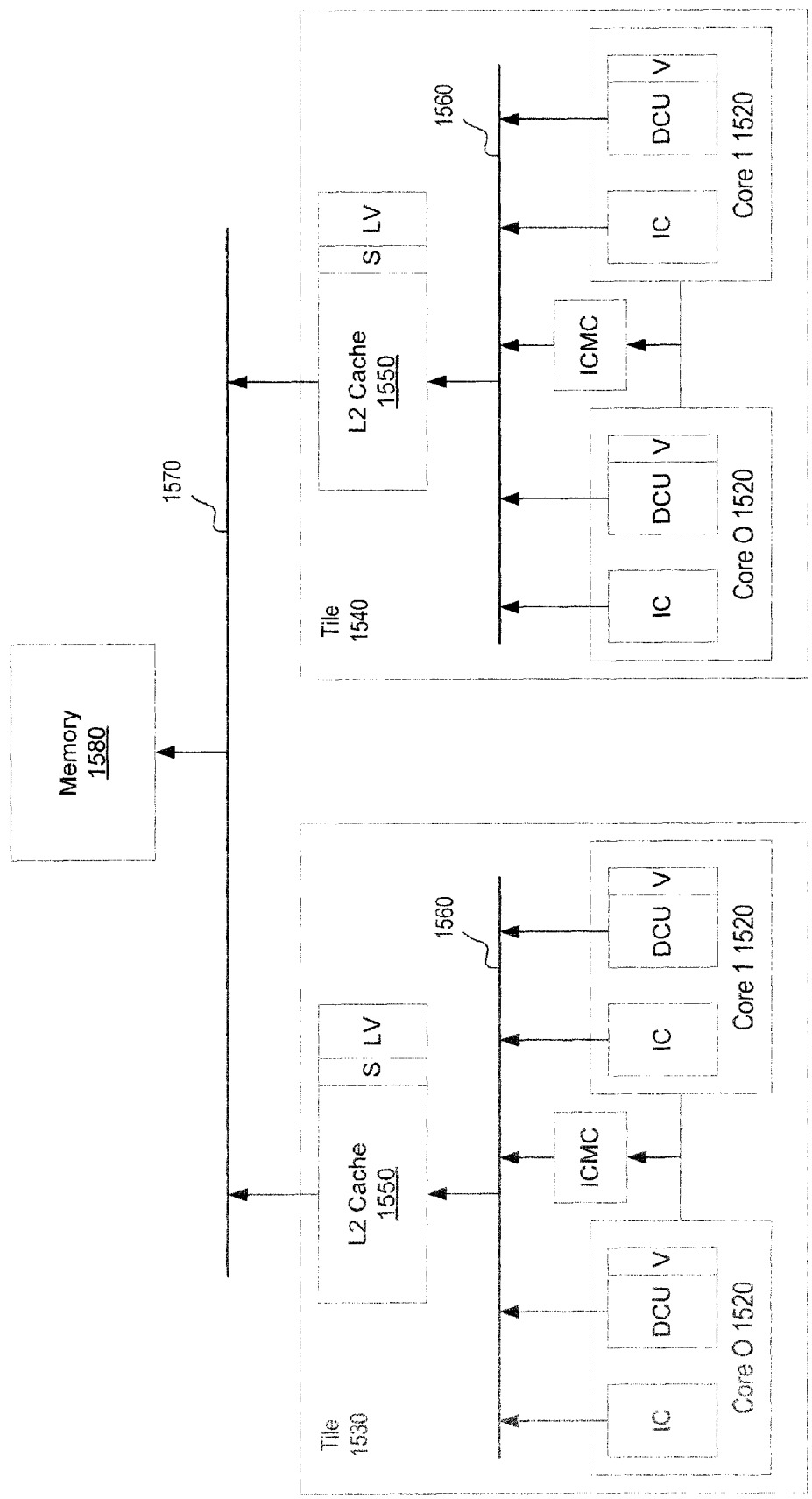
FIG. 15 is a block diagram illustrating an embodiment of a multi-core system on which embodiments of the thread ordering reconstruction mechanism may be employed.

FIG. 15 is a block diagram illustrating an embodiment of a multi-core system on which embodiments of the thread ordering reconstruction mechanism may be employed. Simplified for ease of reference, the system of FIG. 15 may have additional elements though such elements are not explicitly illustrated in FIG. 15.

As discussed above, in the fine-grained SpMT ecosystem, a program is divided into one or more threads to be executed on one or more processing cores. These processing cores each process a thread and the result of this processing is merged to create the same result as if the program was run as a single thread on a single core (albeit the division and/or parallel execution should be faster). During such processing by the different cores the state of the execution is speculative. When the threads reach their last instruction, they synchronize to exit to the optimized region, the speculative state becomes non-speculative, and execution continues with one single thread and the tile resumes to single-core mode for that program. A "tile" as used herein is described in further detail below in connection with FIG. 15. Generally, a tile is a group of two or more cores that work to concurrently execute different portions of a set of otherwise sequential instructions (where the "different" portions may nonetheless include replicated instructions).

FIG. 15 illustrates a multi-core system that is logically divided into two tiles 1530, 1540. For at least one embodiment, the processing cores 1520 of the system are based on x86 architecture. However, the processing cores 1520 may be of any architecture such as PowerPC, etc. For at least one embodiment, the processing cores 1520 of the system execute instructions out-of-order. However, such an embodiment should not be taken to be limiting. The mechanisms discussed herein may be equally applicable to cores that execute instructions in-order. For at least one embodiment, one or more of the tiles 1530, 1540 implements two cores 1520 with a private first level write-through data cache ("DCU") and instruction cache ("IC"). These caches, IC and DCU, may be coupled to a shared copy-back L2 1550 cache through a split transactional bus 1560. Finally, the L2 cache 1550 is coupled through another interconnection network 1570 to main memory 1580 and to the rest of the tiles 1530, 1540.

The L2 cache 1550 is called a MLC ("Merging Level Cache") and is a shared cache between the cores of the tile. For the embodiment illustrated in FIG. 15, the first level of shared cache is the second-level cache. It is at this merging level cache where merging between processing cores (threads) is performed. For other embodiments, however, the L2 cache need not necessarily be the merging level cache among the cores of the tile. For other embodiments, the MLC may be a shared cache at any level of the memory hierarchy.

For at least one embodiment, tiles 1530, 1540 illustrated in FIG. 15 have two different operation modes: single-core (normal) mode and cooperative mode. The processing cores 1520 in a tile execute conventional threads when the tile is in single-core mode and they execute speculative threads (one in each core) from the same decomposed application when the tile is in cooperative mode.

It should be noted that execution of the optimized code should be performed in cooperative-mode for the tile which has the threads. Therefore, when these two threads start running the optimized code, and the spawn instruction triggers, the cores transition from single-core mode to cooperative-core mode.

When two speculative threads are running on a tile (e.g., 1530 or 1540) with cooperation-mode activated, synchronization among them occurs when an inter-thread dependence must be satisfied by an explicit communication. However, communications may imply synchronization only on the consumer side. Regular memory or dedicated logic may be used for these communications.

Normal execution mode or normal mode (or single mode) is when a processing core is executing non-speculative multithreading code while another processing core in the tile is either idle or executing another application. For example, processing core 0 of tile 1530 is executing non-speculative multithreading code and core 1 is idle. Speculative execution mode, or speculative mode, refers to when both cores are cooperating to execute speculative multithreading code. In normal and speculative mode, each core fetches, executes and retires instructions independently. In speculative mode, checkpoints (discussed later) are taken at regular intervals such that rollback to a previous consistent state may be made if a memory violation if found.

The processing cores transition from normal mode to speculative mode once a core retires a spawn instruction (assuming that the other core is idle, otherwise execution is resumed in normal mode). On the other hand, the processing cores transition from speculative to normal mode once the application jumps to a code area that has not been decomposed into threads or when a memory violation is detected. A memory violation occurs when a load executing in one core needs data generated by a store executed in another core. This happens because the system cannot guarantee an order among the execution of instructions assigned to different threads. In the presence of a memory violation, a squash signal generated by the ICMC is propagated to all the cores and caches , the state is rolled back to a previous consistent state and execution is resumed in normal mode.

In order to update the architectural memory state and check for potential memory violations in the original sequential program order, reconstruction the original program order is made. In an embodiment, this is done by putting all locally retired memory instructions of each processing core in a corresponding FIFO structures, discussed in further detail below, and accessing and removing the head instructions in these queues in the original sequential program order by means of some instruction marks. When an instruction retires in a processing core, this means that this is the oldest instruction in that processing core and it is put at the tail of its corresponding FIFO (referred to as local retirement). The memory hierarchy continuously gets the oldest instruction in the system (that resides in the head of any of the FIFOs) and accesses the MLC and its associated bits in the sequential program order (referred to as the global retirement of the instruction).

Figure 16:
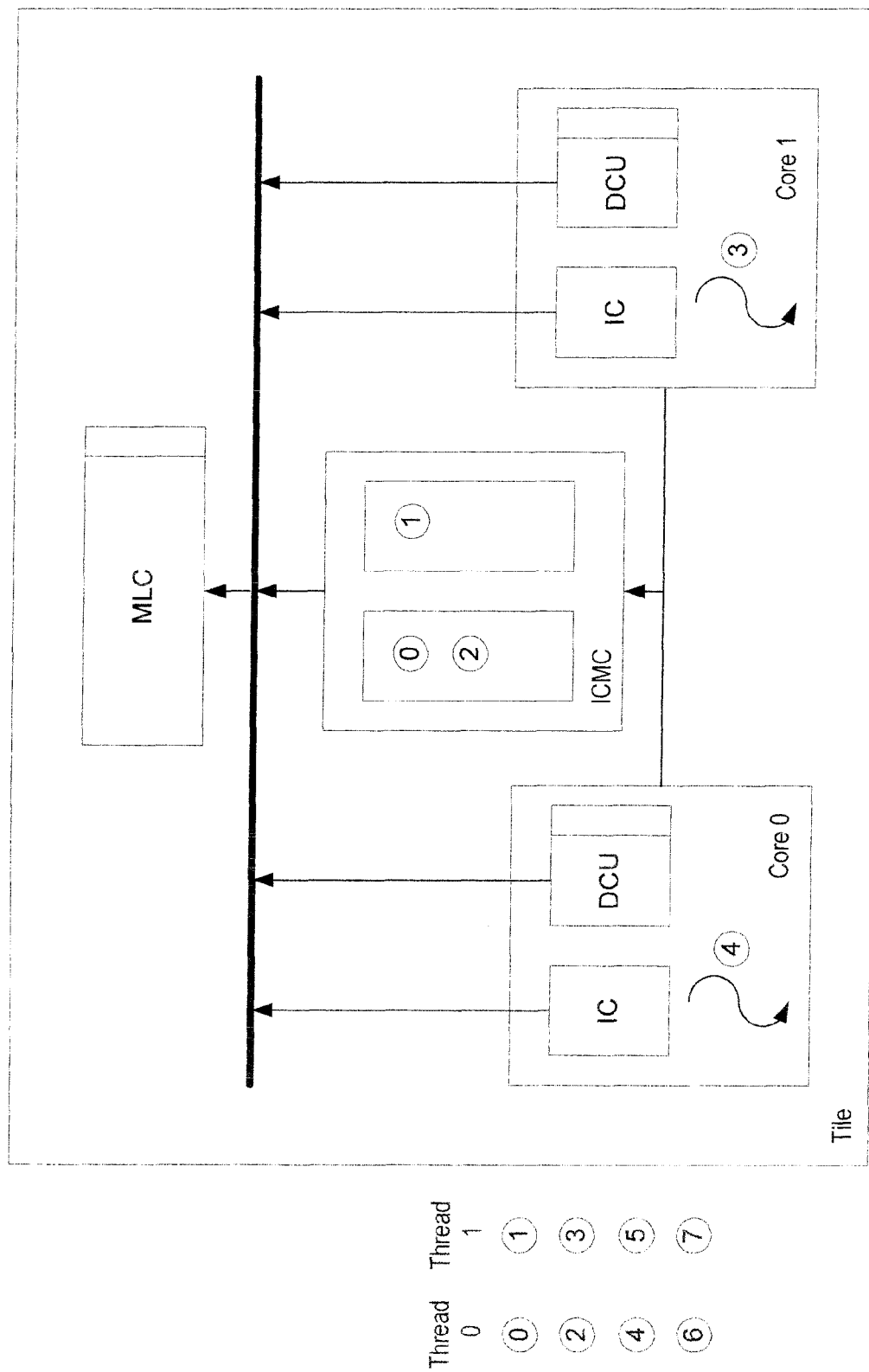
FIG. 16 illustrates an example of a tile operating in cooperative mode.

FIG. 16 illustrates an example of a tile operating in cooperative mode. In this figure, instructions 3 and 4 are being locally retired in cores 1 and 0 respectively. The ICMC has globally committed instructions 0, 1, and 2 in program order and will update the MLC accordingly. The ICMC will also check for memory violations.

The Inter-Core Memory Coherency Module (ICMC) module that supports the decomposed threads and may control one or more of the following: 1) sorting memory operations to make changes made by the decomposed application visible to the other tiles as if it would have been executed sequentially; 2) identifying memory dependence violations among the threads running on the cores of the tile; 3) managing the memory and register checkpoints; and/or 4) triggering rollback mechanisms inside the cores in case of a misprediction, exception, or interrupt.

For at least one embodiment, the ICMC interferes very little with the processing cores. Hence, in processing cooperative mode, the cores fetch, execute, and retire instructions from the speculative threads in a decoupled fashion most of the time. Then, a subset of the instructions is sent to the ICMC after they retire in order to perform the validation of the execution. For at least one embodiment, the set of instructions considered by the ICMC is limited to memory and control instructions.

When executing in cooperative mode, the ICMC reconstructs the original sequential order of memory instructions that have been arbitrarily assigned to the speculative threads in order to detect memory violations and update memory correctly. Such an order is reconstructed by the ICMC using marks called Program Order Pointer (POP) bits. POP bits are included by the compiler in memory instructions and certain unconditional branches.

Exemplary Memory Hierarchy for Speculative Multi-Threading

Figure 17:
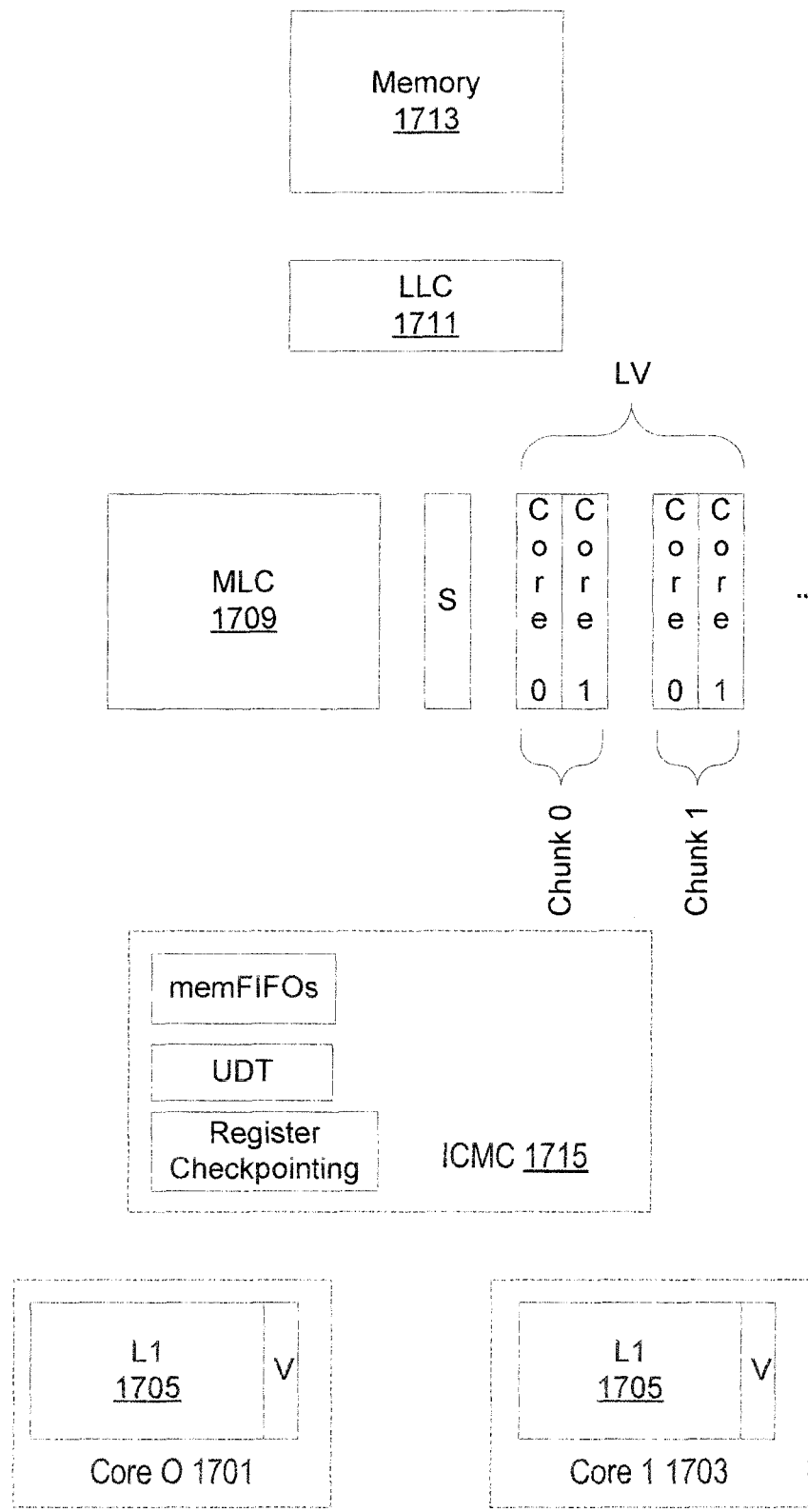
FIG. 17 is a block diagram illustrating an exemplary memory hierarchy that supports speculative multithreading according to at least one embodiment of the present invention.

FIG. 17 is a block diagram illustrating an exemplary memory hierarchy that supports speculative multithreading according to at least one embodiment of the present invention. In the normal mode of operation (non-speculative), the memory hierarchy acts a regular hierarchy, that is, the traditional memory hierarchy protocol (MESI or any other) propagates and invalidates cache lines as needed.

The hierarchy of FIG. 17 includes one or more processing cores (cores 1701 and 1703). Each processing core of the hierarchy has a private first-level data cache unit (DCU) 1705 which is denoted as "L1" in the figure. The processing cores also share at least one higher level cache. In the embodiment illustrated, the processing cores 1701 and 1703 share a second-level data cache 1709 and a last-level cache "L3" 1711. The hierarchy also includes memory such as main memory 1713 and other storage such as a hard disk, optical drive, etc. Additionally, the hierarchy includes a component called the Inter-Core Memory Coherency Module (ICMC) 1715 that is in charge of controlling the activity of the cores inside the tile when they execute in cooperative mode. This module may be a circuit, software, or a combination thereof. Each of these exemplary components of the memory hierarchy is discussed in detail below.

Data Cache Units (DCUs)

When operating in the normal mode, the DCUs are write-through and operate as a regular L1 data caches. In speculative mode, they are neither write-through nor write-back and replaced dirty lines are discarded. Moreover, modified values are not propagated. These changes from the normal mode allow for versioning because merging and the ultimately correct values will reside in the Merging Level Cache ("MLC") as will be discussed later.

In an embodiment, the DCU is extended by including a versioned bit ("V") per line that is only used in speculative mode and when transitioning between the modes. This bit identifies a line that has been updated while executing the current speculative multithreading code region. Depending upon the implementation, in speculative mode, when a line is modified, its versioned bit is set to one to indicate the change. Of course, in other implementations a versioned bit value of zero could be used to indicate the same thing with a value of one indicating no change.

When transitioning from normal mode to speculative mode, the V bits are reset to a value indicating that no changes have been made. When transitioning from speculative to normal mode, all lines with a versioned bit set to indicate a changed line are modified to be invalid and the versioned bit is reset. Such a transition happens when the instruction that marks the end of the region globally retires or when a squash signal is raised by the ICMC (squash signals are discussed below).

In speculative mode, each DCU works independently and therefore each has a potential version of each piece of data. Therefore, modified values are not propagated to higher levels of cache. The MLC is the level at which merging is performed between the different DCU cache line values and it is done following the original sequential program semantics, as explained in previous sections. When transitioning from speculative mode to normal mode, the valid lines only reside at the MLC. Hence, the speculative lines are cleared in the DCUs. Store operations are sent to the ICMC which is in charge of updating the L2 cache in the original order when they globally commit.

Merging Level Cache

In an embodiment, the L2 cache 1709 serves as a MLC that is shared cache between the processing cores. For other embodiments, however, the L2 cache need not necessarily be the merging level cache among the processing cores. For other embodiments, the MLC is a shared cache at another level of the memory hierarchy.

As illustrated, the MLC is extended from a typical cache by the inclusion of a speculative ("S") bit per cache line and two last-version ("LV") bits per chunk (there would of course be more LV bits for more processing cores). A chunk is the granularity at which memory disambiguation between the two speculative threads (and hence, memory violations) are detected. It can range between a byte and the size of the line, and it is a trade-off between accuracy and area.

The S bit indicates that a cache line contains a speculative state. It is cleared when a checkpoint is performed and the memory is safe again as is discussed below. On the other hand, the LV bits indicate which core performed the last change to each chunk. For example, in an embodiment, a LV value of "01" for the first chuck of a line indicates that core 1 was the last core that performed a change to that chunk. These bits are set as store instructions globally retire and they are not cleared until there is a transition back to normal mode (as opposed to the S bit, which is cleared between checkpoints). Global retirement is performed in the original program order. Furthermore, stores are tagged to identify whether they are replicated or not. This helps to ensure that the system can capture memory violations. LV bits for all lines are set by default to indicate that reading from any core is correct.

Figure 18:
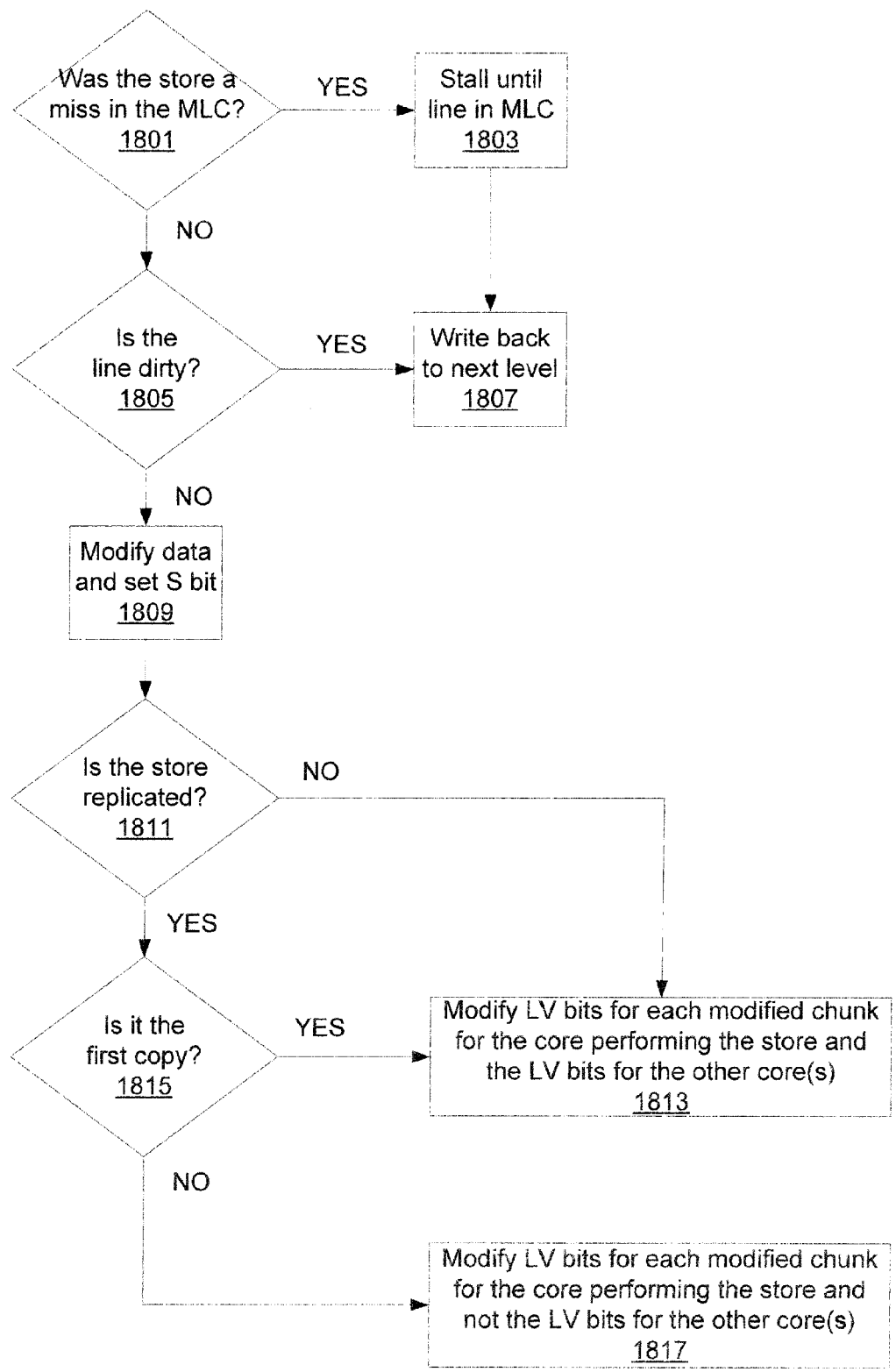
FIG. 18 illustrates an embodiment of a method of actions to take place when a store is globally retired in optimized mode.

An embodiment of a method of actions to take place when a store is globally retired in optimized mode is illustrated in FIG. 18. At 1801, a determination is made of if the store missed the MLC (i.e., it was a L2 cache miss). If the store was a miss, global retirement is stalled until the line is present in the MLC at 1803. If the store was present in the MLC (or when the line arrives in the MLC), a determination is made of if the line was dirty at 1805. If it is dirty with non-speculative data (e.g., S bit unset), the line is written back to the next level in the memory hierarchy at 1807. Regardless, the data is modified at 1809 and the S bit is set to 1.

A determination of if the store is replicated is made at 1811. If the store is not replicated the LV bits corresponding to each modified chunk are set to 1 for the core performing the store and 0 for the other at 1813. If the store is replicated, another determination is made at 1815. This determination is whether the store was the first copy. If the store is replicated and it is the first copy, the LV bits corresponding to each modified chunk are set to 1 for the core performing the store and 0 for the other at 1813. If the store is replicated and it is not the first copy, the LV bits corresponding to each modified chunk are set to 1 for the core performing the store and the other is left as it was at 1817.

Figure 19:
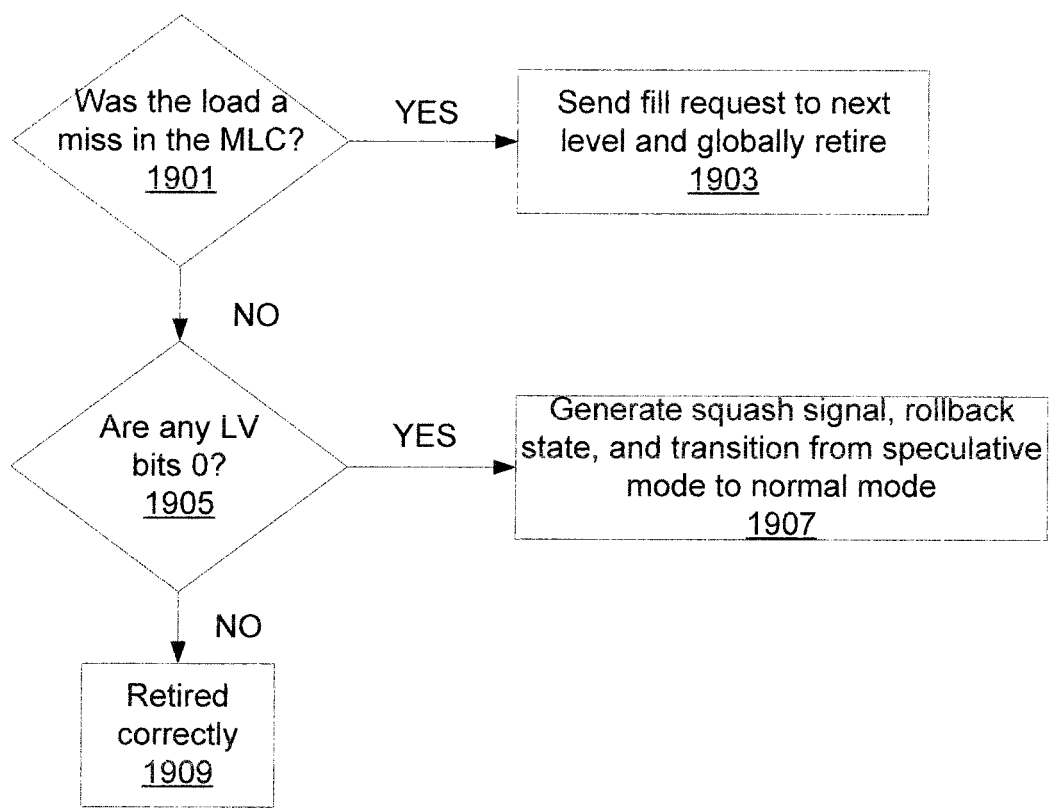
FIG. 19 illustrates an embodiment of a method of actions to take place when a load is about to be globally retired in optimized mode.

An embodiment of a method of actions to take place when a load is about to be globally retired in optimized mode is illustrated in FIG. 19. At 1901, a determination is made of if the load missed the MLC. If it is a miss, a fill request is sent to the next level in the memory hierarchy and the load is globally retired correctly at 1903.

If it was a hit, a determination of if there are any of the LV bits of the corresponding chuck are 0 is made at 1905. If any of such LV bits have a value of 0 for the corresponding core it means that that particular core did not generate the last version of the data. Hence, a squash signal is generated, the state is rolled back, and the system transitions from speculative mode to normal mode at 1907. Otherwise, the load is globally retired correctly at 1909.

In addition, in some embodiments the behavior of the MLC in presence of other events is as follows: 1) When the current checkpoint is finished satisfactorily (the last instruction of the checkpoint globally retires correctly), the speculative (S) bits of all lines are set to 0. Note that the LV bits are not cleared until the execution transitions from speculative to normal mode; 2) When a line with the S bit set is replaced from the MLC, a squash signal is generated. This means that the current cache configuration cannot hold the entire speculative memory state since the last checkpoint. Since checkpoints are taken regularly, this happens rarely as observed from our simulations. However, if this is a concern, one may use of a refined replacement algorithm (where speculative lines are given low priority) or a victim cache to reduce the amount of squashes; 3) When transitioning from speculative to normal mode, in addition to clearing all the S bits, the LV bits are also cleared (set to 1); and 4) When a squash signal is raised, all lines with a speculative bit set to one are set to invalid (the same happens in all DCUs) and the S bits are reset. Also, the LV bits are cleared (set to 1).

Inter-Core Memory Coherency Module (ICMC)

Figure 20:
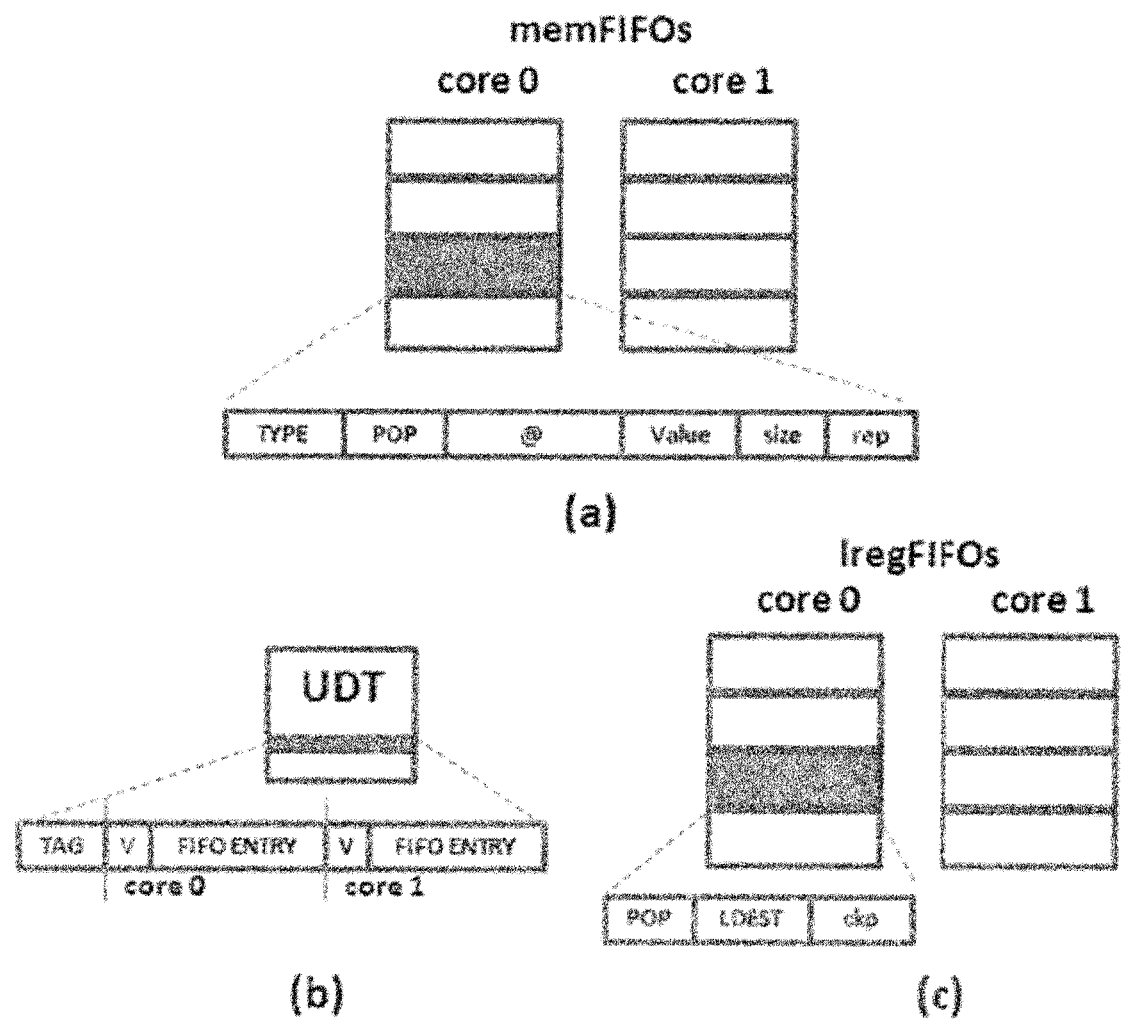
FIG. 20 illustrates an embodiment of an ICMC.

In addition to the usual cache levels, there are other structures which are discussed in further detail below. These additional structures constitute the Inter-Core Memory Coherency Module ("ICMC"). The ICMC and the bits attached to the lines of the DCU and MLC are not used in normal mode. The ICMC receives ordering instructions and handles them through three structures: 1) memory FIFOs; 2) an update description table (UDT); and 3) register checkpointing logic (see FIG. 20). The ICMC sorts ordering instructions to make changes made by the multi-threaded application visible to other tiles as if it was executed sequentially and to detect memory dependence violations among the threads running on the cores of the tile. The ICMC and memory hierarchy inside a tile allow each core running in a cooperative mode to update its own memory state, while still committing the same state that the original sequential execution will produced by allowing different versions of the same line in multiple L1 caches and avoiding speculative updates to propagate outside the tile. Additionally, register checkpoint allows for the rollback to a previous state to correct a misspeculation.

The ICMC implements one FIFO queue per core called memory FIFOs (memFIFOs). When a core retires an ordering instruction, that instruction is stored in the memFIFO associated with the core. The ICMC processes and removes the instructions from the memFIFOs based on the POP bits. The value of the POP bit of the last committed instruction identifies the head of the memFIFO where the next instruction to commit resides. Note that instructions are committed by the ICMC when they become the oldest instructions in the system in original sequential order. Therefore, this is the order in which store operations may update the shared cache levels and be visible outside of a tile. For the duration of the discussion below, an instruction retires when it becomes the oldest instruction in a core and retirement has occurred. By contrast, an instruction globally commits, or commits for short, when the instruction is processed by the ICMC because is the oldest in the tile.

MemFIFO entries may include: 1) type bits that identify the type of instruction (load, store, branch, checkpoint); 2) a POP value; 3) a memory address; 4) bits to describe the size of the memory address; 5) bits for a store value; and 6) a bit to mark replicated (rep) instructions. Replicated instructions are marked to avoid having the ICMC check for dependence violations.

MemFIFOs allow each core to fetch, execute, and retire instructions independently. The only synchronization happens when a core prevents the other core from retiring an instruction. A core may eventually fill up its memFIFO and stall until one or more of its retired instructions leave the memFIFO. This occurs when the next instruction to commit has to be executed by a different core and this instruction has not retired yet.

The cache coherence protocol and cache modules inside a tile are slightly modified in order to allow different versions of the same line in multiple first cache levels. Moreover, some changes are also needed to avoid speculative updates to propagate outside the tile. The L1 data caches do not invalidate other L1 caches in cooperative mode when a line is updated and accordingly each L1 cache may have a different version of the same datum. As discussed above, the V bit of a line in one core is set when a store instruction executes in that core and updates that line similar to {ref}. Such speculative updates to the L1 are not propagated (written-through) to the shared L2 cache. Store operations are sent to the ICMC and will update the L2 cache when they commit. Thus, when a line with its V bit set is replaced from the L1, its contents are discarded. Finally, when the cores transition from cooperative mode to single-core mode, all the L1 lines with the V bit set are invalidated since the correct data resides in the L2 and the ICMC.

When a store commits, it updates the corresponding L2 line and sets its S bit to 1. Such S bit describes that the line has been modified since the last checkpoint. Once a new checkpoint is taken, the S bits are cleared. In case of a misspeculation, the threads are rolled back and the lines with an S bit set are invalidated. Hence, when a non-speculative dirty line is to be updated by a speculative store, the line must be written back to the next memory level in order to have a valid non-speculative version of the line somewhere in the memory hierarchy. Since speculative state cannot go beyond the L2 cache, an eviction from the L2 of a line that is marked as speculative (S) implies rolling back to the previous checkpoint to resume executing the original application.

On the other hand, the LV bits indicate what core has the last version of a particular chunk. When a store commits, it sets the LV bits of the modified chunks belonging to that core to one and resets the rest. If a store is tagged as replicated (executed by both cores), both cores will have the latest copy. In this case, the LV bits are set to 11. Upon a global commit of a load, these bits are checked to see whether the core that executed the load was the core having the last version of the data. If the LV bit representing the core that executed the load is 0 and the bit for the other core is 1, a violation is detected and the threads are squashed. This is so because as each core fetches, executes and retires instructions independently and the L1 caches also work decoupled from each other, the system can only guarantee that a load will read the right value if this was generated in the same core.

The UDT is a table that describes the L2 lines that are to be updated by store instructions located in the memFIFO queues (stores that still have not been globally retired). For at least one embodiment, the UDT is structured as a cache (fully-associative, 32 entries, for example) where each entry identifies a line and has the following fields per thread: a valid bit (V) and a FIFO entry id, which is a pointer to a FIFO entry of that thread. The UDT delays fills from the shared L2 cache to the L1 cache as long as there are still some stores pending to update that line. This helps avoid filling the L1 with a stale line from the L2. In particular, a fill to the L1 of a given core is delayed until there are no more pending stores in the memFIFOs for that particular core (there is no any entry in the UDT for the line tag). Hence, a DCU fill is placed in a delaying request buffer if an entry exists in the UDT for the requested line with the valid bit corresponding to that core set to one. Such a fill will be processed once that valid bit is unset. There is no need to wait for stores to that same line by other cores, since if there is a memory dependence the LV bits will already detect it, and in case that the two cores access different parts of the same line, the ICMC will properly merge the updates at the L2.

In speculative mode, when a store is locally retired and added to a FIFO queue, the UDT is updated. Let us assume for now that an entry is available. If an entry does not exists for that line, a new one is created, the tag is filled, the valid bit of that thread is set, the corresponding FIFO entry id is updated with the ID of the FIFO entry where the store is placed, and the valid bit corresponding to the other core is unset. If an entry already exists for that line, the valid bit of that thread is set and the corresponding FIFO entry id is updated with the id of the FIFO entry where the store is placed.

When a store is globally retired, it finds its corresponding entry in the UDT (it is always a hit). If the FIFO entry id of that core matches the one in the UDT of the store being retired, the corresponding valid bit is set to zero. If both valid bits of an entry are zero, the UDT entry is freed and may be reused for forthcoming requests. When transitioning from speculative to normal mode, the UDT is cleared.

In order to avoid overflowing, a UDT "Stop and Go" mechanism is implemented. When the number of available entries in the UDT is small and there is risk of overflow, a signal is sent to the cores to prevent them from locally retiring new stores. Note that a credit-based control cannot be implemented since the UDT is a shared structure which can be written from several cores. Furthermore, in order to avoid deadlocks and guarantee forward progress, a core cannot use more than N−1 UDT entries, being N the total number of entries. In such case, that core is prevented from locally retiring new stores. This leaves room for the other thread to make progress if it is the one executing the oldest instructions in the system.

An entry in the UDT has the following fields: the tag identifying the L2 cache line, plus a valid bit attached to a memFIFO entry id for each core. The memFIFO entry id is the entry number of that particular memFIFO of the last store that updates that line. This field is updated every time a store is appended to a memFIFO. If a store writes a line without an entry in the UDT then it allocates a new entry. By contrast, if a committed store is pointed by the memFIFO entry ID then its valid bit is set to false; and if both valid bits are false then the entry is removed from the UDT.

The ICMC also may include register checking pointing logic described in detail below. The structures discussed above (e.g., ICMC and the S, V, and LV bits) may reside somewhere else in the memory hierarchy for embodiments in which this private/shared interface among the cores is moved up or down. Accordingly, embodiments described herein may be employed in any particular memory subsystem configuration.

Computing the Architectural Register State of a Speculatively Parallelized Code

Embodiments of the reconstruction scheme discussed herein include register checkpointing to roll back the state to a correct state when a particular speculation is wrong. The frequency of the checkpoints has important implications in the performance. The more frequent checkpoints are, the lower the overhead due to a misspeculation is, but the higher the overhead to create them is. In this section scheme is described that can take frequent checkpoints of the architectural register state for single threaded code whose computation has been split and distributed among multiple cores with extremely low overhead.

At least one embodiment of the mechanism for register checkpointing allows a core to retire instructions, reclaim execution resources and keep doing forward progress even when other cores are stalled. Register checkpointing described in this section allows safe early register reclamation so that it allows forward progress increasing very little the pressure on the register files. For at least one embodiment of the present invention, checkpoints are taken very frequently (every few hundreds of instructions) so that the amount of wasted work is very little when rollback is needed due to either an interrupt or data misspeculation. Thus, embodiments of the disclosed mechanisms make it possible to perform more aggressive optimizations because the overhead of the data misspeculations is reduced.

In contrast with previous speculative multithreading schemes, embodiments of the present invention do not need to generate the complete architectural state; the architectural state can be partially computed by multiple cores instead. This allows for a more flexible threading where instructions are distributed among cores at finer granularity than in traditional speculative multithreading schemes.

According to at least one embodiment of the present invention, cores do not have to synchronize in order to get the architectural state at a specific point. The technique virtually seamlessly merges and builds the architectural state.

Embodiments of the present invention create a ROB (Reorder Buffer) where instructions retired by the cores are stored in the order that they should be committed to have the same outcome as if the original single threaded application had been executed. However, since the threads execute asynchronously, the entries in this ROB are not allocated sequentially. Instead there are areas where it is not known either how many nor the kind of instructions to be allocated there. This situation may happen if for instance core 0 is executing a region of code that should be committed after the instructions executed from core 1. In this case, there is a gap in this conceptual ROB between the instructions already retired by core 1 and the retired by core 0 that belongs to those instructions that have not been executed/retired by core 1 yet.

Figure 21:
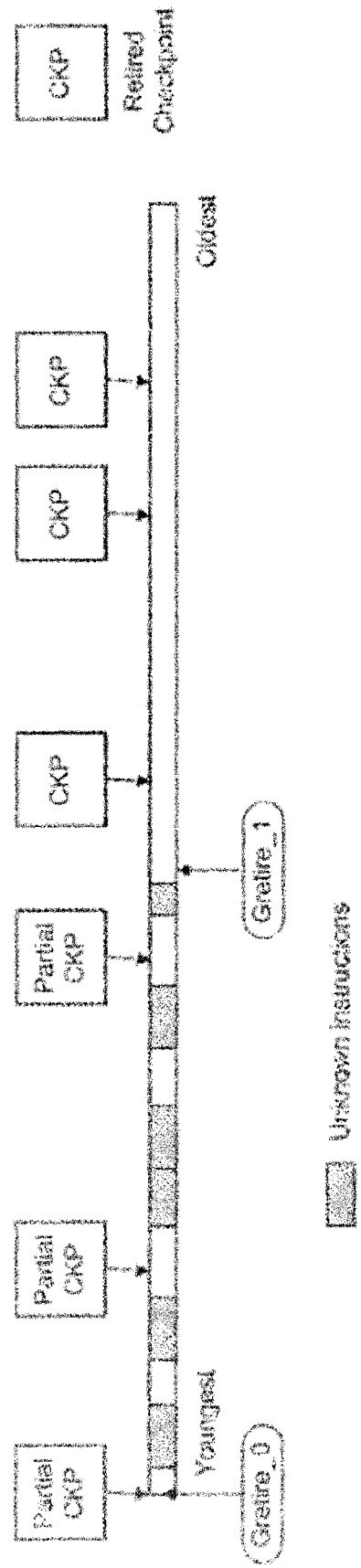
FIG. 21 illustrates at least one embodiment of a ROB of the checkpointing mechanism.

FIG. 21 illustrates at least one embodiment of a ROB of the checkpointing mechanism. In this ROB, GRetire_0 points to the last instruction retired by core 0 and GRetire_1 points to the last instruction retired by core 1. As it can be seen, core 0 goes ahead of core 1 so that there are gaps (shown as shaded regions) in the ROB between GRetire_0 and GRetire_1. At a given time, a complete checkpoint has pointers to the physical registers in the register files (either in core 0 or 1) where the value resides for each logical register.

A checkpoint (ckp) is taken by each core every time it retires a predefined amount of instructions. Note that checkpoints taken by the core that retires the youngest instructions in the system are partial checkpoints. It cannot be guaranteed that this core actually produces the architectural state for this point of the execution until the other core has retired all instructions older than the taken checkpoint.

By contrast, checkpoints taken by the core that does not retire the youngest instruction in the system are complete checkpoints because it knows the instructions older than the checkpoint that the other core has executed. Therefore, it knows where each of the architectural values resides at that point. The reason why core 0 in this example takes also periodic checkpoints after a specific number of instructions even though they are partial is because all physical registers that are not pointed by these partial checkpoints are reclaimed. This feature allows this core to make forward progress with little increase on the pressure over its register file. Moreover, as soon as core 1 reaches this checkpoint, it is guaranteed that the registers containing the values produced by core 0 that belong to the architectural state at this point have not been reclaimed so that complete checkpoint may be built with the information coming from core 1. Moreover, those registers allocated in core 0 that did not belong to the checkpoint because they were overwritten by core 1 can also be released.

A checkpoint can be released and its physical registers reclaimed as soon as a younger complete checkpoint is taken by the core that retires an instruction that is not the youngest in the system (core 1 in the example). However, it may happen that the threading scheme requires some validation that is performed when an instruction becomes the oldest in the system. Therefore, a checkpoint older than this instruction is used to rollback there in case the validation fails. In this scenario a complete checkpoint is released after another instruction with a complete checkpoint associated becomes the oldest in the system and is validated properly.

Every instruction executed by the threads has an associated IP_orig that is the instruction pointer ("IP") of the instruction in original code to jump in case a checkpoint associated to this instruction is recovered. The translation between IPs of the executed instructions and its IP_origs is stored in memory (in an embodiment, the compiler or the dynamic optimizer are responsible of creating this translation table). Thus, whenever a checkpoint is recovered because of a data misspeculation or an interrupt, the execution would continue at the IP_orig of the original single threaded application associated to the recovered checkpoint.

It should be noted that the core that goes ahead and the core that goes behind is not always the same and this role may change over time depending on the way the original application was turned into threads.

At a given time, a complete checkpoint has pointers to the physical registers in the register files (either in core 0 or 1) where the value resides for each logical register. A checkpoint can be released and its physical registers reclaimed when all instruction have been globally committed and a younger checkpoint becomes complete.

A checkpoint is taken when a CKP instruction inserted by the compiler is found, and at least a minimum number of dynamic instructions have been globally committed since the last checkpoint (CKP_DIST_CTE). This logic is shown in FIG. 15. This CKP instruction has the IP of the recovery code which is stored along with the checkpoint, so that when an interrupt or data misspeculation occurs, the values pointed by the previous checkpoint are copied to the core that will resume the execution of the application.

Figure 22:
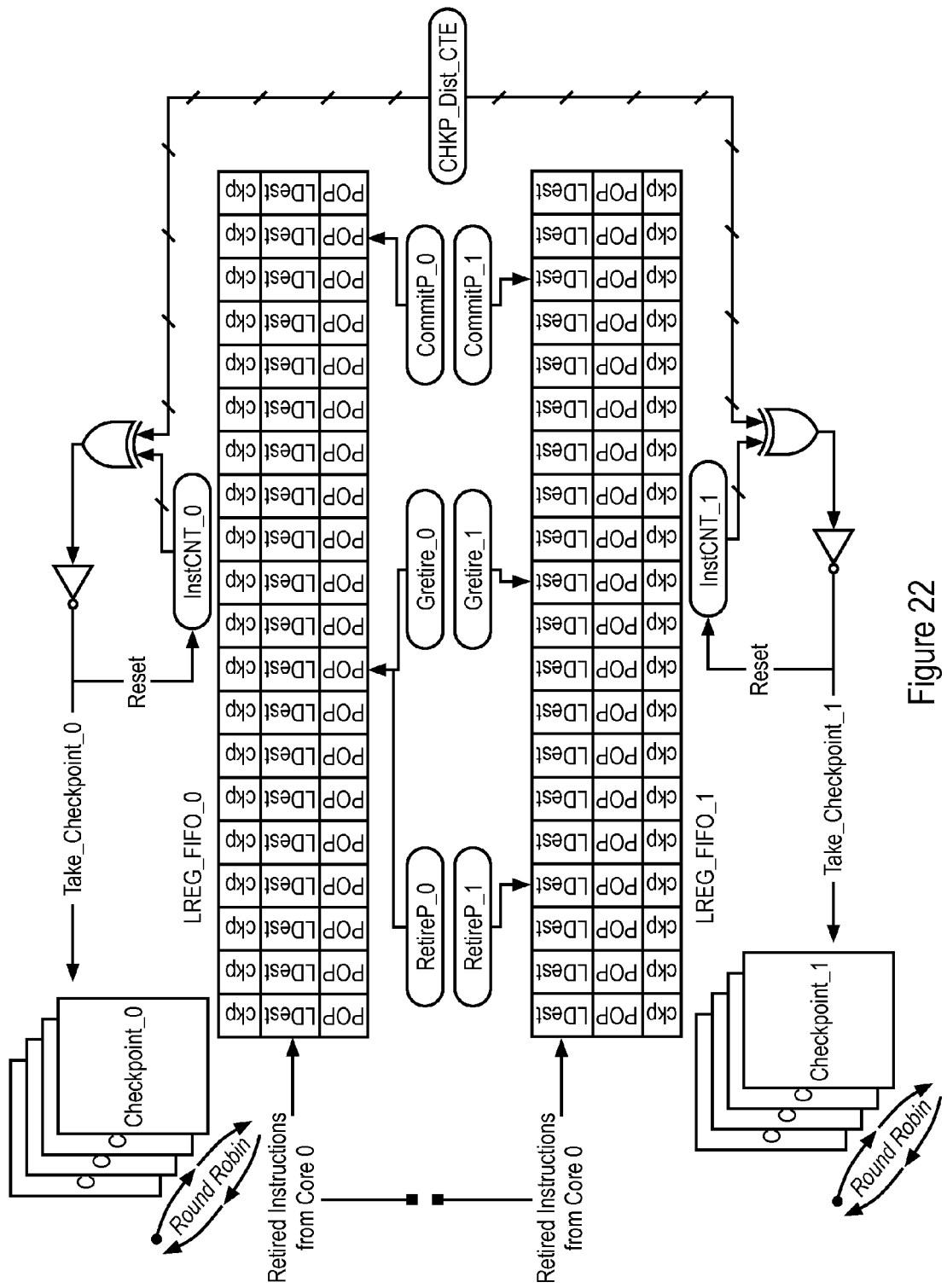
FIG. 22 is a block diagram illustrating at least one embodiment of register checkpointing hardware.

FIG. 22 is a block diagram illustrating at least one embodiment of register checkpointing hardware. For at least one embodiment, a portion of the register checkpointing hardware illustrated sits between/among the cores of a tile. For example, in an embodiment the logic gates are outside of the tile and the LREG_FIFO are a part of the ICMC. In an embodiment, the ICMC includes one or more of: 1) a FIFO queue (LREG_FIFO) per core; 2) a set of pointers per LREG_FIFO; and 3) a pool of checkpoint tables per LREG_FIFO. Other logic such as a multiplexer (MUX) may be used instead of the NOR gate for example.

Retired instructions that write to a logical register allocate and entry in the LREG_FIFO. FIG. 22 illustrates what an entry consists of: 1) a field named ckp that is set to 1 in case there is an architectural state checkpoint associated to this entry; 2) a LDest field that stores the identifier of the logical register the instruction overwrites; and 3) the POP field to identify the thread that contains the next instruction in program order. The POP pointer is a mechanism to identify the order in which instructions from different threads should retire in order to get the same outcome as if the single-threaded application would have been executed sequentially. However, this invention could work with any other mechanism that may be used to identify the order among instructions of different threads generated from a single threaded application.

The set of pointers includes: 1) a RetireP pointer per core that points to the first unused entry of the LREG_FIFO where new retired instructions allocate the entry pointed by this register; 2) a CommitP pointer per core that points to the oldest allocated entry in the LREG_FIFO which is used to deallocate the LREG_FIFO entries in order; and 3) a Gretire pointer per core that points to the last entry in the LREG_FIFO walked in order to build a complete checkpoint. Also illustrated is a CHKP_Dist_CTE register or constant value. This register defines the distance in number of entries between two checkpoints in a LREG_FIFO. Also illustrated an Inst_CNT register per LREG_FIFO that counts the number of entries allocated in the LREG_FIFO after the last checkpoint.

The pool of checkpoint tables per LREG_FIFO defines the maximum number of checkpoints in-flight. Each pool of checkpoints works as a FIFO queue where checkpoints are allocated and reclaimed in order. A checkpoint includes the IP of the instruction where the checkpoint was created, the IP of the rollback code, and an entry for each logical register in the architecture. Each of these entries have: the physical register ("PDest") where the last value produced prior to the checkpoint resides for that particular logical register; the overwritten bit ("O") which is set to 1 if the PDest identifier differs from the PDest in the previous checkpoint; and the remote bit ("R") which is set to 1 if the architectural state the logical register resides in another core. These bits are described in detail below.

FIG. 22 also illustrates a data structure located in the application memory space which is indexed by the IP and the thread id of an instruction coming from one of the threads and maps it into the IP of the original single-threaded application to jump when the architectural state in that specific IP of that thread is recovered.

Every time a core retires an instruction that produces a new architectural register value, this instruction allocates a new entry in the corresponding LREG_FIFO. Then, the entry in the active checkpoint is read for the logical register it overwrites. When the O bit is set, the PDest identifier stored in the entry is reclaimed. Then, the O bit is set and the R bit unset. Finally, the PDest field is updated with the identifier of the physical register that the retired instruction allocated. Once the active checkpoint has been updated, the InstCNT counter is decreased and when it is 0 the current checkpoint is copied to the next checkpoint making this next checkpoint the active checkpoint and all O bits in the new active checkpoint are reset and the InstCNT register set to CHKP_Dist_CTE again.

If the GRetire pointer matches the RetireP pointer this means that this instruction is not the youngest instruction in the system so that it should behave as core 1 in the example of FIG. 14. Thus, the POP bit is checked and when it points to other core, the GRetire pointer of the other core is used to walk the LREG_FIFO of the other core until an entry with a POP pointer pointing is found. For every entry walked, the LDest value is read and the active checkpoint is updated as follows: when the O bit is set, the physical register identifier written in PDest is reclaimed. Then, the O bit is reset, the R bit set, and the PDest updated. If an entry with the ckp bit set to 1, then the partial checkpoint is completed with the information of the active checkpoint. This merging involves reclaiming all PDest in the partial checkpoint where the O bit of the partial checkpoint is set and the R bit in the active checkpoint is reset. Then, the active checkpoint is updated resetting the O bit of these entries. On the other hand, if the GRetire pointer does not match RetireP then nothing else done because the youngest instruction in the system is known.

Finally, a checkpoint can be released when it is determined that it is not necessary to rollback to that checkpoint. If it is guaranteed that all retired instruction are correct and would not raise any exception, a checkpoint may be released as soon as a younger checkpoint becomes complete. By contrast, it is possible that retired instructions require a further validation as it happens in the threading scheme. This validation takes place when an instruction becomes the oldest in the system. In this case, a checkpoint can be released as soon as a younger instruction with an associated checkpoint becomes the oldest in the system and the validation is correct.

Figure 23A:
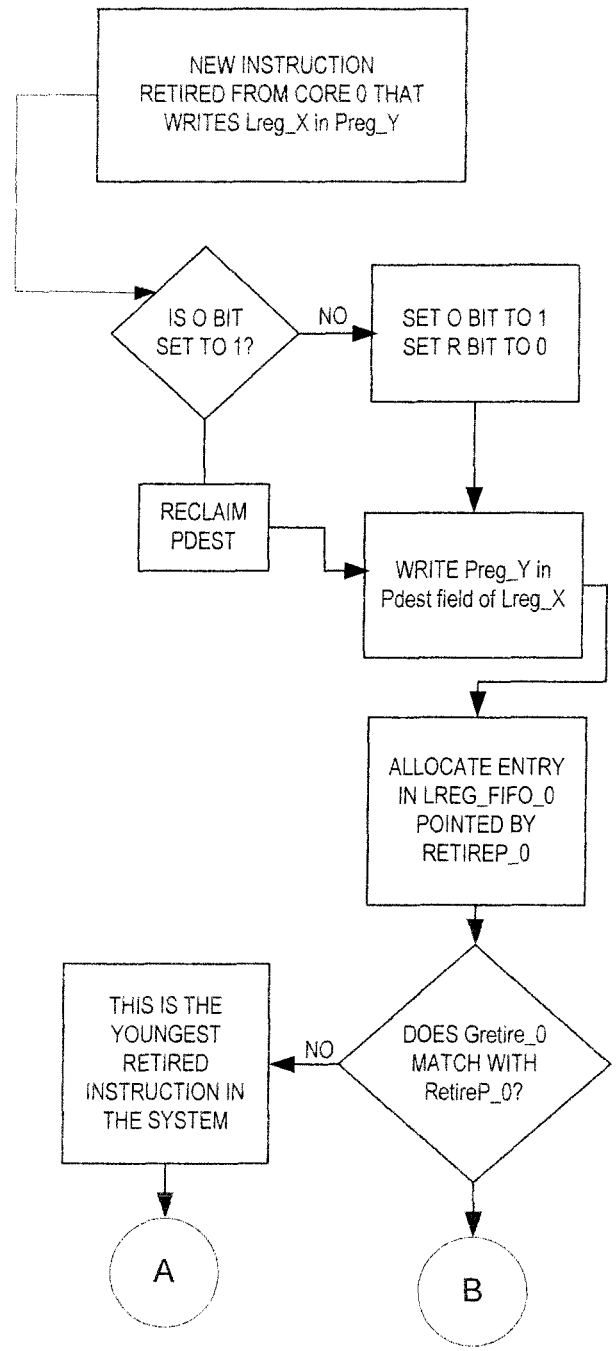
FIG. 23 illustrates an embodiment of using checkpoints.
Figure 23B:
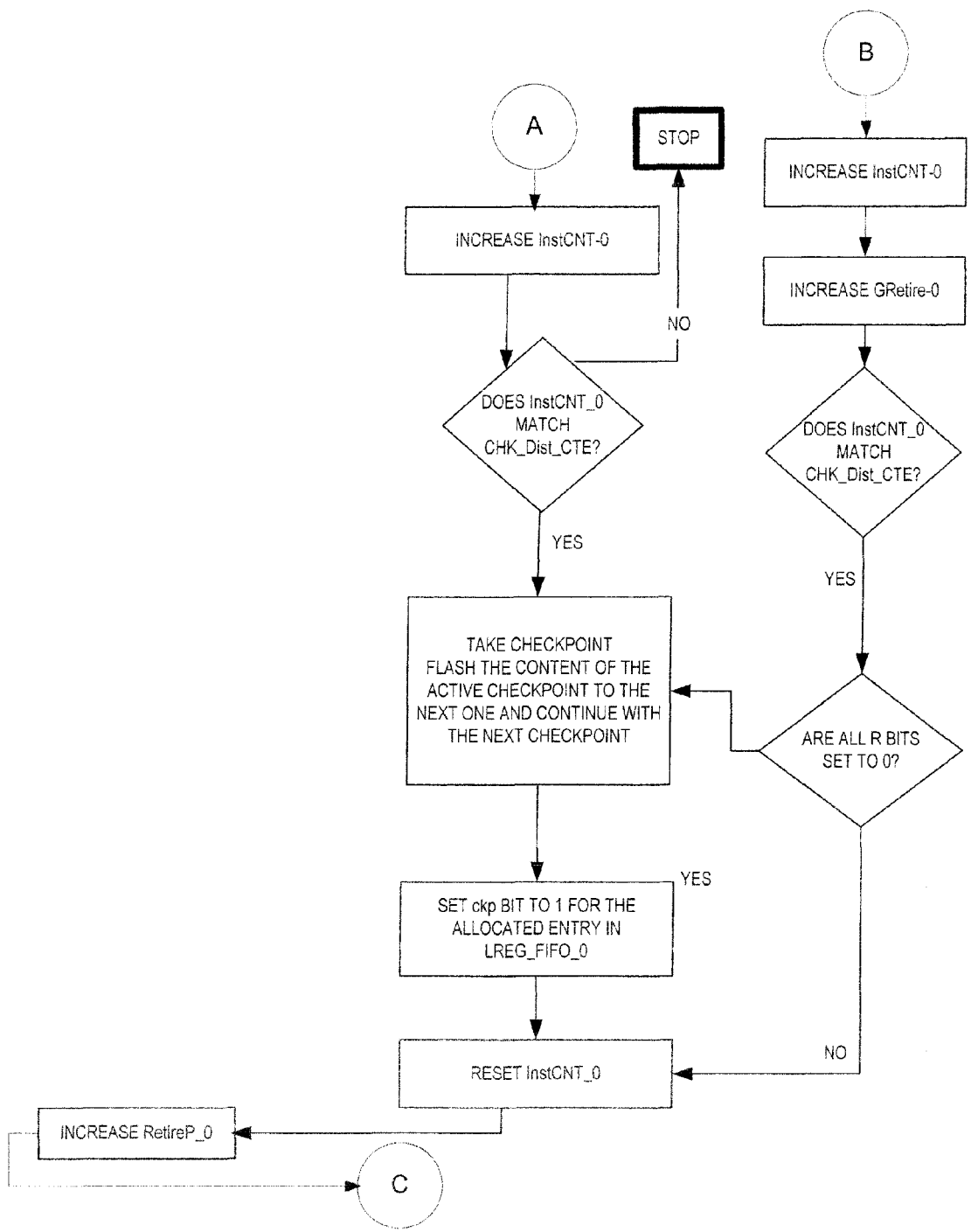
Figure 23C:
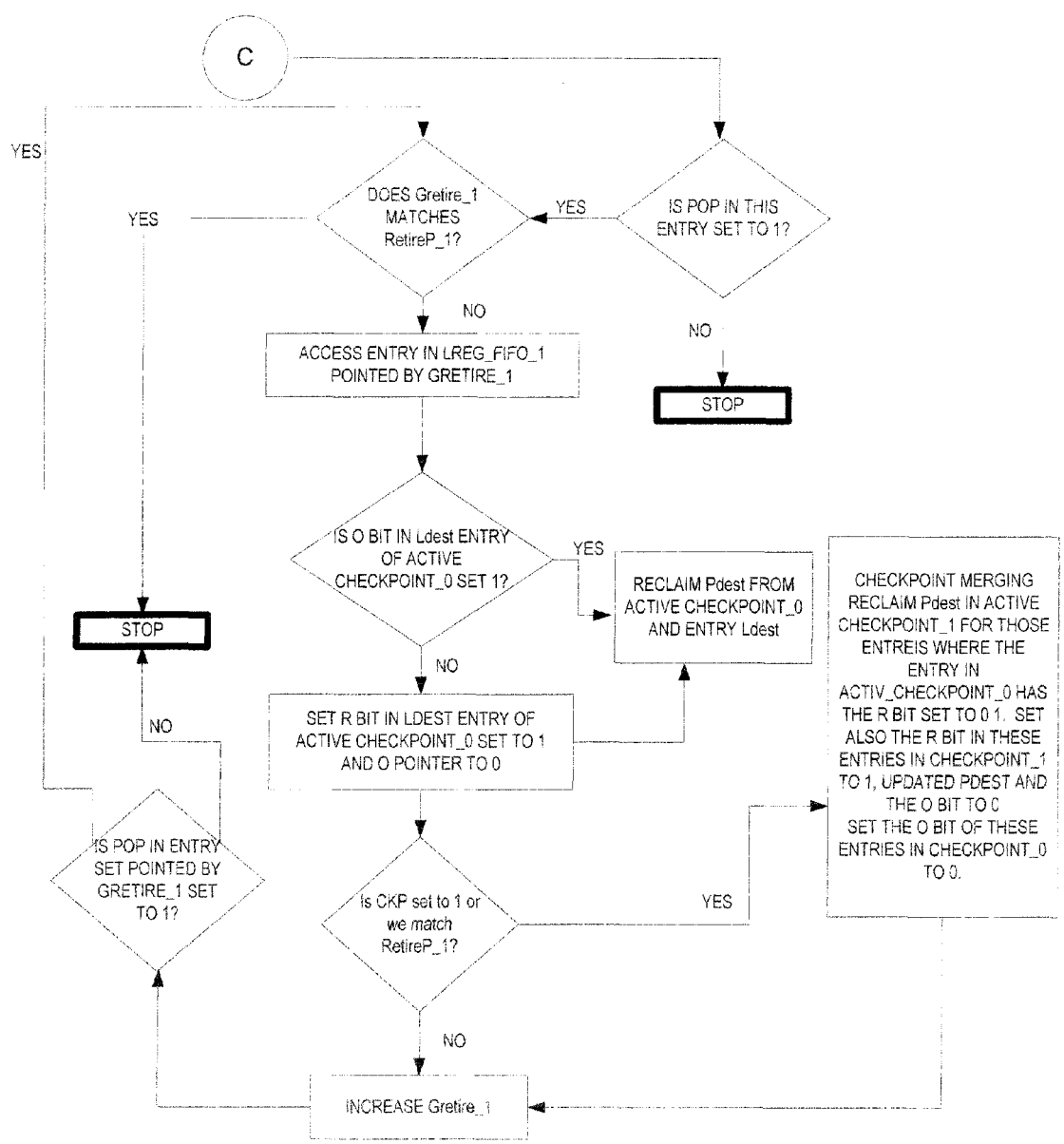

Whenever an interrupt or data misspeculation occurs, the values pointed by the previous checkpoint should be copied to the core that will resume the execution of the application. This copy may be done either by hardware or by software as the beginning of a service routine that will explicitly copy these values. Once the architectural state is copied, the table used to translated from IPs of the thread to original IPs is acceded with the IP of the instruction where the checkpoint was taken (the IP was stored by the time the checkpoint was taken) to get the IP of the original single threaded application. Then, the execution resumes jumping to the obtained original IP and the original single threaded application will be executed until another point in the application where threads can be spawned again is found. A detailed illustration of the above is shown FIG. 23.

Exemplary SpMT Systems

Figure 24:
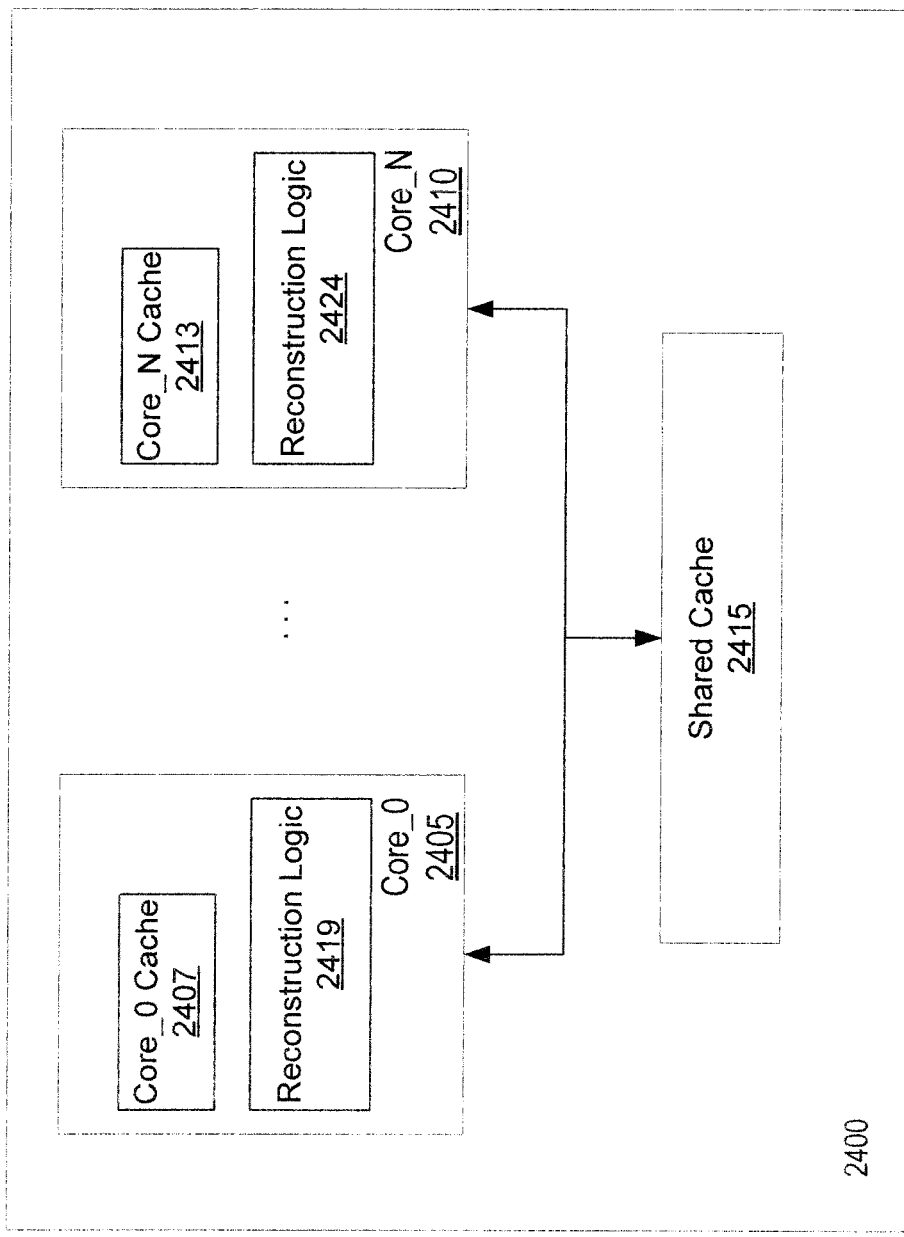
FIG. 24 illustrates an embodiment of a microprocessor that utilizes thread level reconstruction.

FIG. 24 illustrates an embodiment of a microprocessor that utilizes thread level reconstruction. In particular, FIG. 24 illustrates microprocessor 2400 having one or more processor cores 2405 and 2410, each having associated therewith a local cache 2407 and 2413, respectively. Also illustrated in FIG. 24 is a shared cache memory 2415 which may store versions of at least some of the information stored in each of the local caches 2407 and 2413. In some embodiments, microprocessor 2400 may also include other logic not shown in FIG. 24, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 2419 to reconstruct sequential execution from a decomposed instruction stream, in accordance with at least one embodiment. The logic may include circuits, software (embodied in a tangible medium), or both to enable more efficient resource allocation among a plurality of cores or processors than in some prior art implementations.

Figure 25:
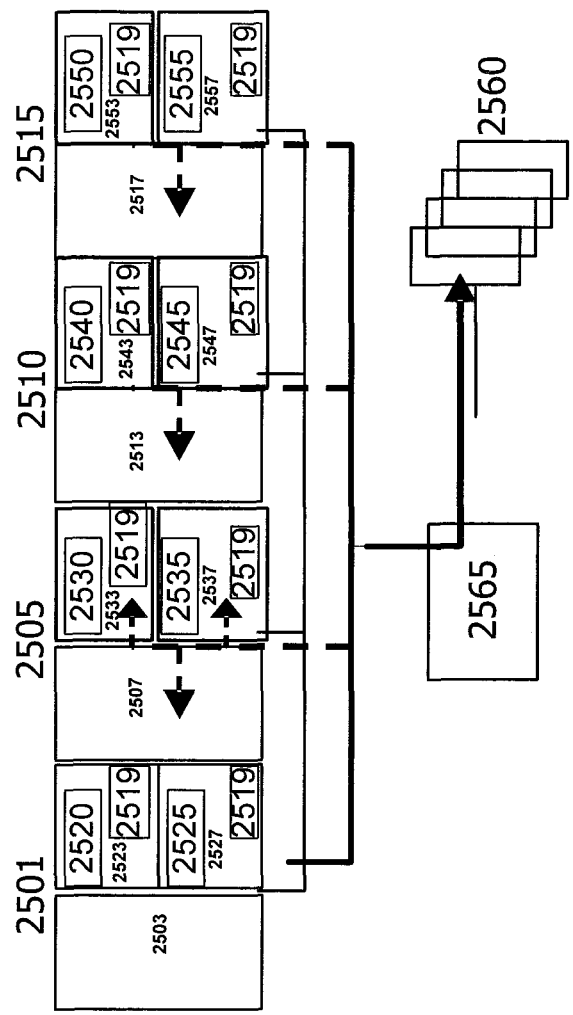
FIG. 25 illustrates a front-side-bus (FSB) computer system in which one embodiment of the invention may be used.

FIG. 25, for example, illustrates a front-side-bus (FSB) computer system in which one embodiment of the invention may be used. Any processor 2501, 2505, 2510, or 2515 may access information from any local level one (L1) cache memory 2520, 2527, 2530, 2535, 2540, 2545, 2550, 2555 within or otherwise associated with one of the processor cores 2525, 2527, 2533, 2537, 2543, 2547, 2553, 2557. Furthermore, any processor 2501, 2505, 2510, or 2515 may access information from any one of the shared level two (L2) caches 2503, 2507, 2513, 2517 or from system memory 2560 via chipset 2565. One or more of the processors in FIG. 25 may include or otherwise be associated with logic 2519 to reconstruct sequential execution from a decomposed instruction stream, in accordance with at least one embodiment.

In addition to the FSB computer system illustrated in FIG. 25, other system configurations may be used in conjunction with various embodiments of the invention, including point-to-point (P2P) interconnect systems and ring interconnect systems.

Figure 26:
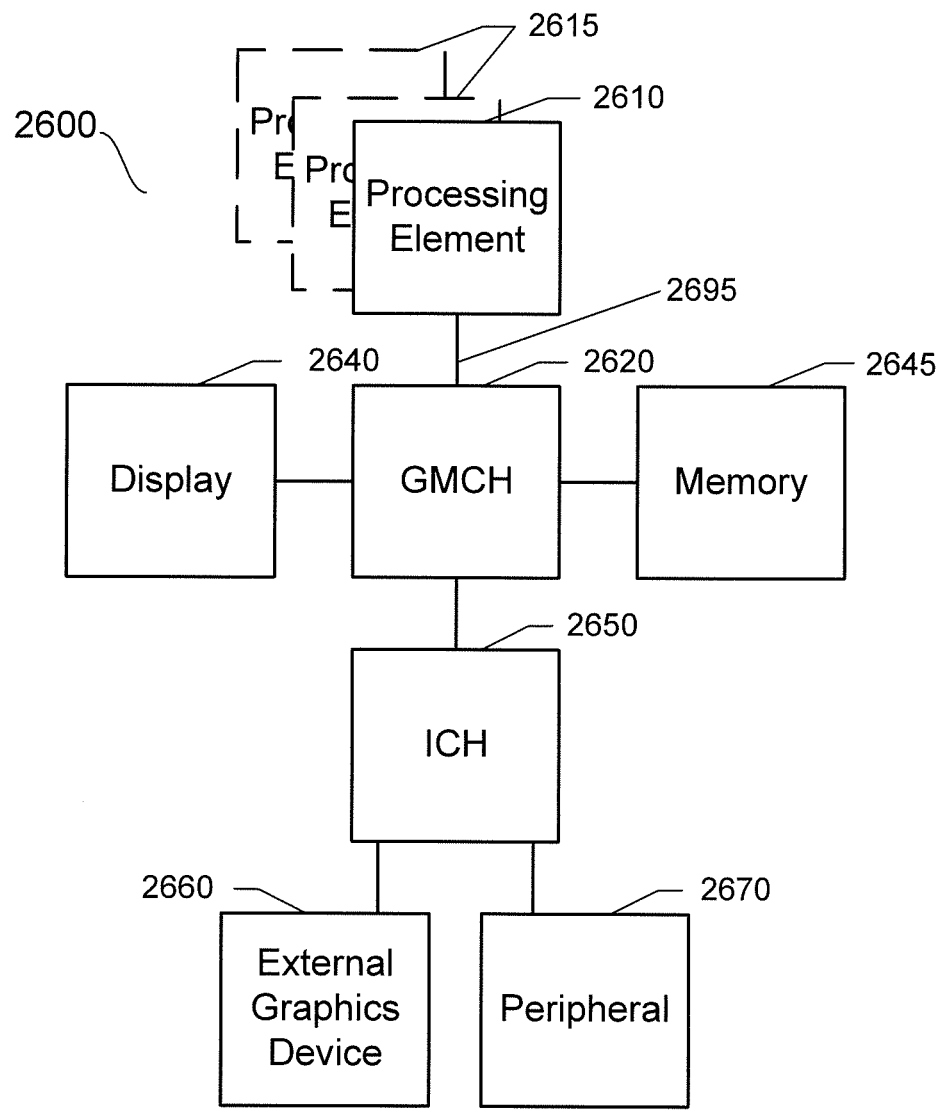
FIG. 26 shows a block diagram of a system in accordance with one embodiment of the present invention.

Referring now to FIG. 26, shown is a block diagram of a system 2600 in accordance with one embodiment of the present invention. The system 2600 may include one or more processing elements 2610, 2615, which are coupled to graphics memory controller hub (GMCH) 2620. The optional nature of additional processing elements 2615 is denoted in FIG. 26 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multi-threaded in that they may include more than one hardware thread context per core.

FIG. 26 illustrates that the GMCH 2620 may be coupled to a memory 2640 that may be, for example, a dynamic random access memory (DRAM). The DRAM may, for at least one embodiment, be associated with a non-volatile cache.

The GMCH 2620 may be a chipset, or a portion of a chipset. The GMCH 2620 may communicate with the processor(s) 2610, 2615 and control interaction between the processor(s) 2610, 2615 and memory 2645. The GMCH 2620 may also act as an accelerated bus interface between the processor(s) 2610, 2615 and other elements of the system 2600. For at least one embodiment, the GMCH 2620 communicates with the processor(s) 2610, 2615 via a multi-drop bus, such as a frontside bus (FSB) 2695.

Furthermore, GMCH 2620 is coupled to a display 2640 (such as a flat panel display). GMCH 2620 may include an integrated graphics accelerator. GMCH 2620 is further coupled to an input/output (I/O) controller hub (ICH) 2650, which may be used to couple various peripheral devices to system 2600. Shown for example in the embodiment of FIG. 26 is an external graphics device 2660, which may be a discrete graphics device coupled to ICH 2650, along with another peripheral device 2670.

Alternatively, additional or different processing elements may also be present in the system 2600. For example, additional processing element(s) 2615 may include additional processors(s) that are the same as processor 2610, additional processor(s) that are heterogeneous or asymmetric to processor 2610, accelerators (such as, e.g., graphics accelerators or digital signal processing (DSP) units), field programmable gate arrays, or any other processing element. There can be a variety of differences between the physical resources 2610, 2615 in terms of a spectrum of metrics of merit including architectural, microarchitectural, thermal, power consumption characteristics, and the like. These differences may effectively manifest themselves as asymmetry and heterogeneity amongst the processing elements 2610, 2615. For at least one embodiment, the various processing elements 2610, 2615 may reside in the same die package.

Figure 27:
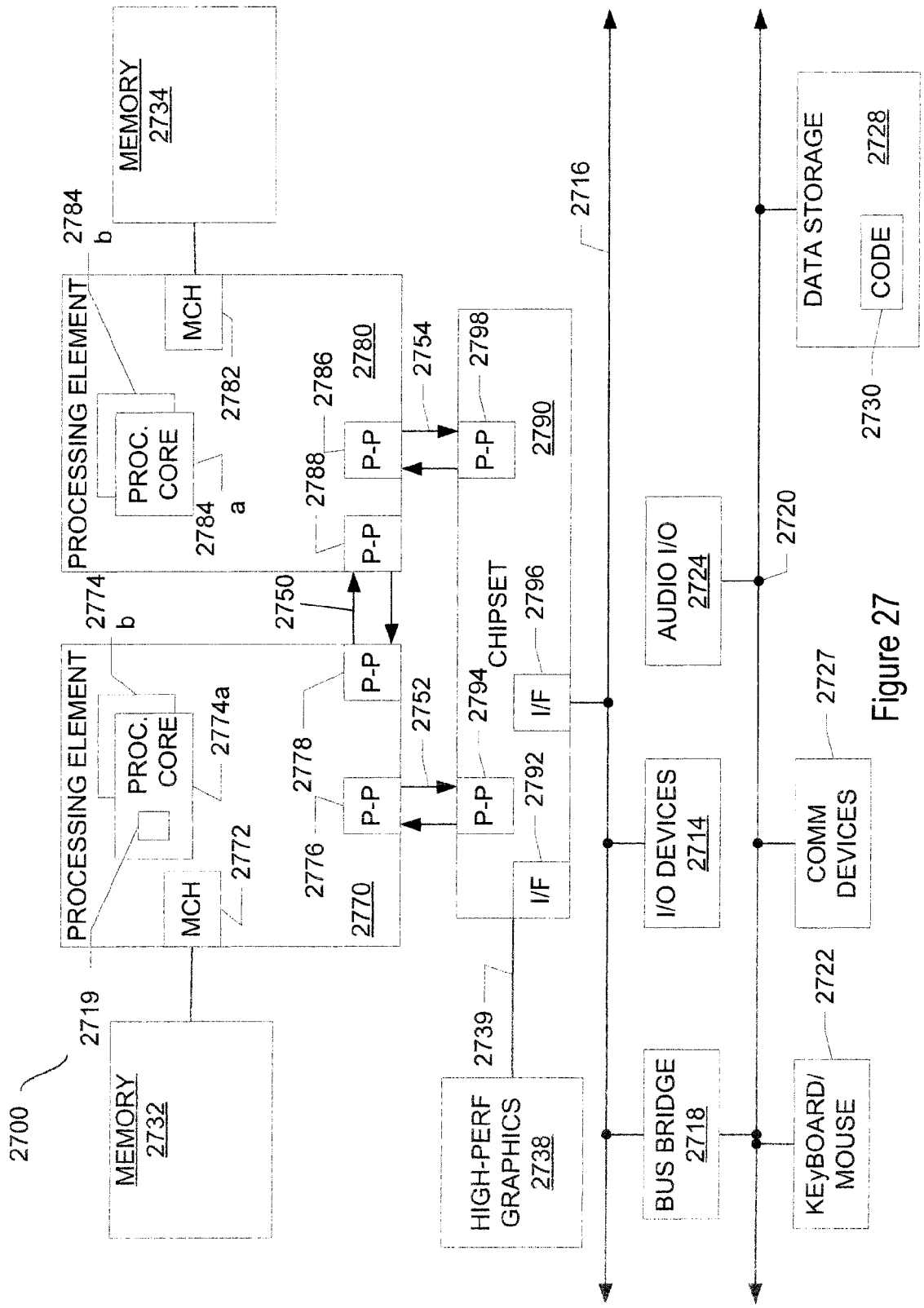
FIG. 27 shows a block diagram of a system embodiment in accordance with an embodiment of the present invention.

Referring now to FIG. 27, shown is a block diagram of a second system embodiment 2700 in accordance with an embodiment of the present invention. As shown in FIG. 27, multiprocessor system 2700 is a point-to-point interconnect system, and includes a first processing element 2770 and a second processing element 2780 coupled via a point-to-point interconnect 2750. As shown in FIG. 27, each of processing elements 2770 and 2780 may be multicore processors, including first and second processor cores (i.e., processor cores 2774a and 2774b and processor cores 2784a and 2784b).

Alternatively, one or more of processing elements 2770, 2780 may be an element other than a processor, such as an accelerator or a field programmable gate array.

While shown with only two processing elements 2770, 2780, it is to be understood that the scope of the present invention is not so limited. In other embodiments, one or more additional processing elements may be present in a given processor.

First processing element 2770 may further include a memory controller hub (MCH) 2772 and point-to-point (P-P) interfaces 2776 and 2778. Similarly, second processing element 2780 may include a MCH 2782 and P-P interfaces 2786 and 2788. Processors 2770, 2780 may exchange data via a point-to-point (PtP) interface 2750 using PtP interface circuits 2778, 2788. As shown in FIG. 27, MCH's 2772 and 2782 couple the processors to respective memories, namely a memory 2742 and a memory 2744, which may be portions of main memory locally attached to the respective processors.

Processors 2770, 2780 may each exchange data with a chipset 2790 via individual PtP interfaces 2752, 2754 using point to point interface circuits 2776, 2794, 2786, 2798. Chipset 2790 may also exchange data with a high-performance graphics circuit 2738 via a high-performance graphics interface 2739. Embodiments of the invention may be located within any processor having any number of processing cores, or within each of the PtP bus agents of FIG. 27. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 27 may include or otherwise be associated with logic 2719 to reconstruct sequential execution from a decomposed instruction stream, in accordance with at least one embodiment.

First processing element 2770 and second processing element 2780 may be coupled to a chipset 2790 via P-P interconnects 2776, 2786 and 2784, respectively. As shown in FIG. 27, chipset 2790 includes P-P interfaces 2794 and 2798. Furthermore, chipset 2790 includes an interface 2792 to couple chipset 2790 with a high performance graphics engine 2748. In one embodiment, bus 2749 may be used to couple graphics engine 2748 to chipset 2790. Alternately, a point-to-point interconnect 2749 may couple these components.

In turn, chipset 2790 may be coupled to a first bus 2716 via an interface 2796. In one embodiment, first bus 2716 may be a Peripheral Component Interconnect (PCI) bus, or a bus such as a PCI Express bus or another third generation I/O interconnect bus, although the scope of the present invention is not so limited.

As shown in FIG. 27, various I/O devices 2714 may be coupled to first bus 2716, along with a bus bridge 2718 which couples first bus 2716 to a second bus 2720. In one embodiment, second bus 2720 may be a low pin count (LPC) bus. Various devices may be coupled to second bus 2720 including, for example, a keyboard/mouse 2722, communication devices 2726 and a data storage unit 2728 such as a disk drive or other mass storage device which may include code 2730, in one embodiment. The code 2730 may include ordering instructions and/or program order pointers according to one or more embodiments described above. Further, an audio I/O 2724 may be coupled to second bus 2720. Note that other architectures are possible. For example, instead of the point-to-point architecture of FIG. 27, a system may implement a multi-drop bus or other such architecture.

Figure 28:
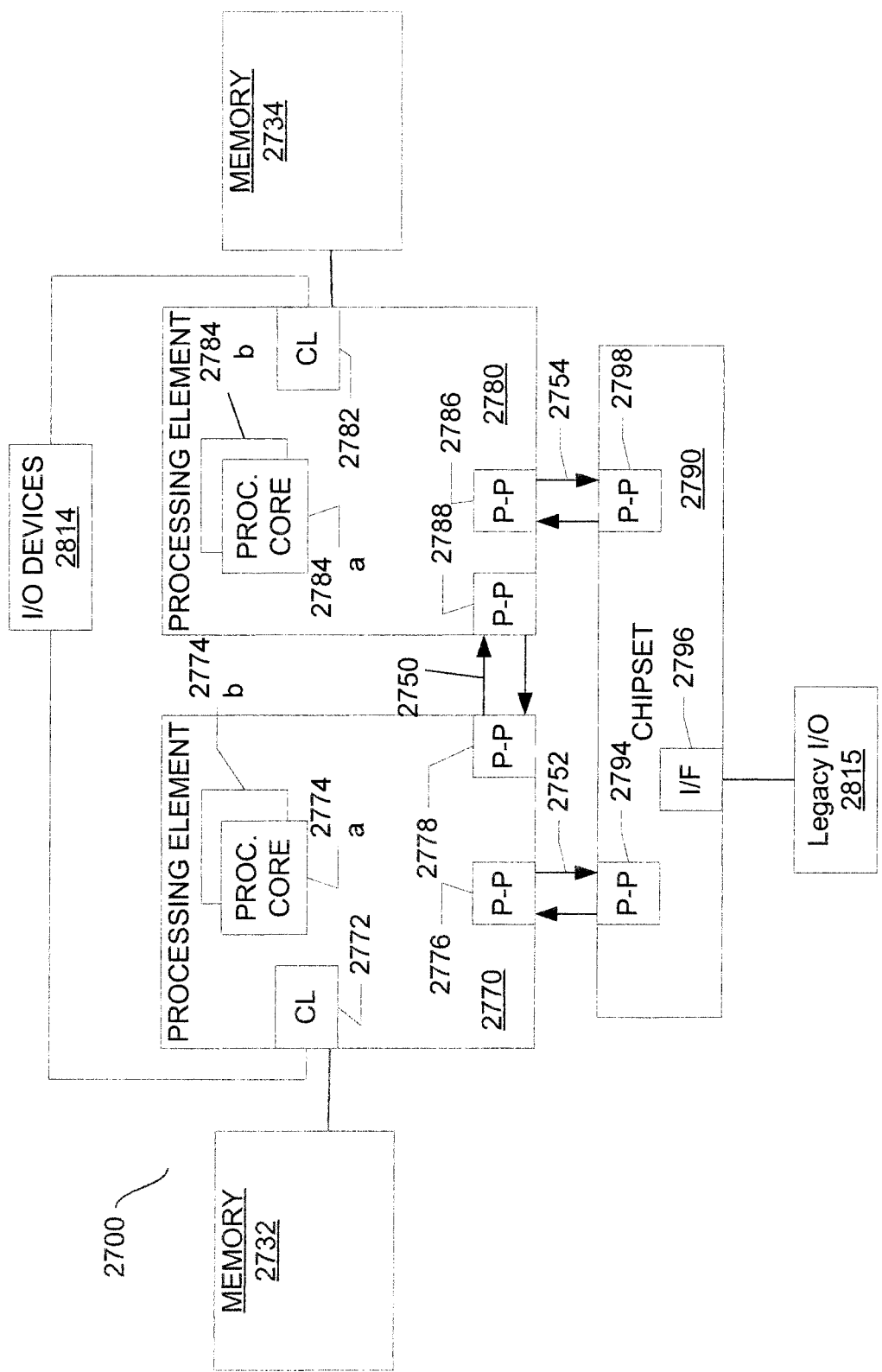
FIG. 28 shows a block diagram of a system embodiment in accordance with an embodiment of the present invention.

Referring now to FIG. 28, shown is a block diagram of a third system embodiment 2800 in accordance with an embodiment of the present invention. Like elements in FIGS. 27 and 28 bear like reference numerals, and certain aspects of FIG. 27 have been omitted from FIG. 28 in order to avoid obscuring other aspects of FIG. 28.

FIG. 28 illustrates that the processing elements 2770, 2780 may include integrated memory and I/O control logic ("CL") 2772 and 2782, respectively. For at least one embodiment, the CL 2772, 2782 may include memory controller hub logic (MCH) such as that described above in connection with FIGS. 26 and 27. In addition. CL 2772, 2782 may also include I/O control logic. FIG. 28 illustrates that not only are the memories 2742, 2744 coupled to the CL 2772, 2782, but also that I/O devices 2814 are also coupled to the control logic 2772, 2782. Legacy I/O devices 2815 are coupled to the chipset 2790.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 2730 illustrated in FIG. 27, may be applied to input data to perform the functions described herein and generate output information. For example, program code 2730 may include an operating system that is coded to perform embodiments of the methods 2500, 2550 illustrated in FIG. 25. Accordingly, embodiments of the invention also include machine-readable media containing instructions for performing the operations embodiments of the invention or containing design data, such as HDL, which defines structures, circuits, apparatuses, processors and/or system features described herein. Such embodiments may also be referred to as program products.

Such machine-readable storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Thus, embodiments of methods, apparatuses, and have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. An apparatus comprising:
a plurality of data cache units (DCUs) to store locally retired instructions of speculatively executed threads, wherein the DCUs include a version bit per line to classify an speculative update status of each line;
a merging level cache (MLC) coupled to the DCUs to merge data from the lines of the DCUs, wherein the MLC includes a speculative bit per cache line to indicate that a cache line contains a speculative state and last version bits to indicate which core of a plurality of cores that made a last change to a chunk, wherein a chunk is a granularity at which memory disambiguation between two speculative threads is detectable; and
a inter-core memory coherency module (ICMC) to globally retire instructions of the speculatively executed threads in the MLC.

2. The apparatus of claim 1, wherein the ICMC further comprises:
a plurality of memory first in, first out (FIFO) queues to store ordering instructions of speculatively executed threads after they are retired, wherein each entry in the memory FIFO queues includes a program order pointer (POP) to identify a head of the memory FIFO queue where a next instruction to commit resides.

3. The apparatus of claim 2, wherein the ICMC further comprises:
a switch to change between the memory FIFO queues during flow reconstruction by the ICMC.

4. The apparatus of claim 2, wherein the ICMC further comprises:
an update description table (UDT) to identify lines of the MLC to be updated by store instructions located in the memory FIFO queues.

5. The apparatus of claim 3, wherein the ICMC further comprises:
register checkpointing logic to rollback to a previous state to correct a misspeculation during execution of the speculatively executed threads.

6. The apparatus of claim 1, further comprising:
a plurality of functional units to process the instructions of the speculatively executed threads.

7. The apparatus of claim 1, further comprising L3 cache coupled to the MLC.

8. A method comprising:
speculatively executing a first and a second thread from a region of code in a first and a second processing core respectively;
locally retiring each instruction of the first and second threads locally in a first level cache of each of the first and second processing cores;
globally retiring each instruction of the first and second threads in a shared merging level cache, wherein the shared merging level cache includes a speculative bit per cache line to indicate that a cache line contains a speculative state and last version bits to indicate which core of a plurality of cores that made a last change to a chunk, wherein a chunk is a granularity at which memory disambiguation between two speculative threads is detectable;
storing each executed ordering instruction of the first and second threads in a memory first in, first out (FIFO) queue corresponding to each of the first and second processing cores;

determining a condition that occurred during the execution of the first and second threads that requires a flow of the region of code to be reconstructed; and reconstructing the flow of the region of code using stored executed ordering instructions.

9. The method of claim 8, further comprising:

reading a first ordering instruction of the speculatively executed region of code stored in a first memory FIFO queue;

reading a program order pointer (POP) value associated with the first ordering instruction; and switching to a second memory FIFO queue and reading a first stored instruction when the POP value indicates a memory FIFO switch.

10. The method of claim 9, wherein the POP value is a one-bit value stored in the memory FIFO.

11. The method of claim 9, further comprising:

reading a next stored instruction of the memory FIFO queue when the POP value indicates no memory FIFO switch.

12. The method of claim 8, wherein software perform the reconstructing the flow of the region of code using stored executed ordering instructions.

13. The method of claim 8, wherein a hardware inter-core memory coherency module (ICMC) performs the reconstructing the flow of the region of code using stored executed ordering instructions.

* * * * *